(12) United States Patent
Shaffer, II et al.

(10) Patent No.: US 11,888,106 B2
(45) Date of Patent: Jan. 30, 2024

(54) BATTERY ASSEMBLY WITH INTEGRATED EDGE SEAL AND METHODS OF FORMING THE SEAL

(71) Applicant: ADVANCED BATTERY CONCEPTS, LLC, Clare, MI (US)

(72) Inventors: Edward O. Shaffer, II, Farwell, MI (US); Don Hobday, Wales (GB); Brian Sturdavant, Clare, MI (US); Adam Cadena, Auburn, MI (US)

(73) Assignee: ADVANCED BATTERY CONCEPTS, LLC, Clare, MI (US)

( * ) Notice: Subject to any disclaimer, the term of this patent is extended or adjusted under 35 U.S.C. 154(b) by 0 days.

(21) Appl. No.: 17/613,696

(22) PCT Filed: May 26, 2020

(86) PCT No.: PCT/US2020/034555
§ 371 (c)(1),
(2) Date: Nov. 23, 2021

(87) PCT Pub. No.: WO2020/243093
PCT Pub. Date: Dec. 3, 2020

(65) Prior Publication Data
US 2022/0223898 A1 Jul. 14, 2022

Related U.S. Application Data

(60) Provisional application No. 62/852,648, filed on May 24, 2019.

(51) Int. Cl.
*H01M 50/516* (2021.01)
*H01M 50/509* (2021.01)
(Continued)

(52) U.S. Cl.
CPC ...... *H01M 10/0418* (2013.01); *H01M 10/044* (2013.01); *H01M 50/516* (2021.01); *H01M 50/609* (2021.01)

(58) Field of Classification Search
None
See application file for complete search history.

(56) References Cited

U.S. PATENT DOCUMENTS

| 414,953 | A | 11/1889 | Roberts |
| 1,712,897 | A | 5/1929 | Morrison |

(Continued)

FOREIGN PATENT DOCUMENTS

| CA | 2560069 A1 | 9/2005 |
| CH | 248315 A | 4/1947 |

(Continued)

OTHER PUBLICATIONS

"Learn More About Heat Sealing Thermoplastic Materials" https://ingeniven.com/what-is-heat-sealing-and-common-heat-sealing-types/ (Year: 2023).*

(Continued)

*Primary Examiner* — Lisa S Park
(74) *Attorney, Agent, or Firm* — The Dobrusin Law Firm, P.C.; Daniela M. Thompson-Walters

(57) ABSTRACT

A method for forming a battery assembly including: a) stacking a plurality of battery plates to form a plurality of electrochemical cells, and b) welding about an exterior periphery of the plurality of battery plates to form one or more integrated edge seals such that one or more individual battery plates are bonded to one or more adjacent battery plates. The one or more individual battery plates may include one or more projections extending from the exterior periphery of the individual battery plate toward the adjacent one or more battery plates; and wherein upon stacking, the (Continued)

one or more projections of the one or more individual battery plates overlap about an exterior of the one or more adjacent battery plates. The integrated edge seal may be formed by one or more projections bonding to the one or more adjacent battery plates.

20 Claims, 7 Drawing Sheets

(51) Int. Cl.
*H01M 10/04* (2006.01)
*H01M 50/609* (2021.01)

(56) References Cited

U.S. PATENT DOCUMENTS

| | | |
|---|---|---|
| 3,522,104 A | 7/1970 | Biddick |
| 4,008,099 A | 2/1977 | Lindstrom |
| 4,098,967 A | 7/1978 | Biddick |
| 4,164,068 A | 8/1979 | Shropshire |
| 4,510,219 A | 4/1985 | Rowlette |
| 4,542,082 A | 9/1985 | Rowlette |
| 4,625,395 A | 12/1986 | Rowlette |
| 4,637,970 A | 1/1987 | Yeh |
| 4,658,499 A | 4/1987 | Rowlette |
| 4,752,545 A | 6/1988 | Brecht |
| 4,861,686 A | 8/1989 | Snyder |
| 4,900,643 A | 2/1990 | Eskra |
| 5,002,841 A | 3/1991 | Belongia |
| 5,035,045 A | 7/1991 | Bowen |
| 5,068,160 A | 11/1991 | Clough |
| 5,114,807 A | 5/1992 | Rowlette |
| 5,288,565 A | 2/1994 | Gruenstern |
| 5,308,717 A | 5/1994 | Gordin |
| 5,308,718 A | 5/1994 | Eidler et al. |
| 5,326,656 A | 7/1994 | Meadows |
| 5,379,502 A | 1/1995 | Feldstein |
| 5,393,617 A | 2/1995 | Klein |
| 5,429,643 A | 7/1995 | Lund et al. |
| 5,441,824 A | 8/1995 | Rippel |
| 5,470,679 A | 11/1995 | Lund et al. |
| 5,510,211 A | 4/1996 | Sundberg |
| 5,582,937 A | 12/1996 | LaFollette |
| 5,585,209 A | 12/1996 | Feldstein |
| 5,593,797 A | 1/1997 | Brecht |
| 5,682,671 A | 11/1997 | Lund |
| 5,688,615 A | 11/1997 | Mrotek |
| 5,800,946 A | 9/1998 | Grosvenor |
| 5,916,709 A | 6/1999 | Arias |
| 6,017,653 A | 1/2000 | Petrakovich |
| 6,077,623 A | 6/2000 | Grosvenor |
| 6,086,643 A | 7/2000 | Clark |
| 6,139,987 A | 10/2000 | Koo et al. |
| 6,159,633 A | 12/2000 | Yang |
| 6,174,337 B1 | 1/2001 | Keenan |
| 6,255,015 B1 | 7/2001 | Corrigan et al. |
| 6,280,879 B1 | 8/2001 | Andersen |
| 6,555,267 B1 | 4/2003 | Broman |
| 6,589,298 B1 | 4/2003 | Limoges et al. |
| 6,889,410 B2 | 5/2005 | Shivashankar et al. |
| 7,275,130 B2 | 9/2007 | Klein |
| 8,357,469 B2 | 1/2013 | Shaffer, II et al. |
| 9,166,231 B2 | 10/2015 | Hoshiba |
| 9,379,378 B2 | 6/2016 | Ross |
| 9,553,329 B2 | 1/2017 | Shaffer, II et al. |
| 9,666,860 B2 | 5/2017 | Lam |
| 9,685,677 B2 | 6/2017 | Shaffer, II |
| 9,825,336 B2 | 11/2017 | Shaffer, II et al. |
| 10,141,598 B2 | 11/2018 | Shaffer, II et al. |
| 10,615,393 B2 | 4/2020 | Shaffer, II |
| 2004/0067417 A1 | 4/2004 | Oosawa et al. |
| 2004/0072074 A1 | 4/2004 | Partington |
| 2006/0003223 A1 | 1/2006 | Willson |
| 2006/0234119 A1* | 10/2006 | Kruger .............. H01M 10/0486 |
| | | 429/163 |
| 2006/0263692 A1 | 11/2006 | Kelley |
| 2006/0269801 A1 | 11/2006 | Honbo et al. |
| 2006/0292443 A1 | 12/2006 | Ogg |
| 2007/0148542 A1 | 6/2007 | Szymborski |
| 2007/0212604 A1 | 9/2007 | Ovshinsky |
| 2009/0042099 A1 | 2/2009 | Tatematsu et al. |
| 2009/0098457 A1 | 4/2009 | Kwon |
| 2009/0248124 A1 | 10/2009 | Pianca |
| 2010/0183920 A1 | 7/2010 | Brecht |
| 2011/0014520 A1 | 1/2011 | Ueda |
| 2011/0091770 A1 | 4/2011 | Han et al. |
| 2011/0183166 A1 | 7/2011 | Suga et al. |
| 2011/0183203 A1 | 7/2011 | Du Chunseng et al. |
| 2012/0156559 A1 | 6/2012 | Davies |
| 2013/0065105 A1 | 3/2013 | Faust |
| 2013/0115505 A1 | 5/2013 | Xie |
| 2014/0087237 A1 | 3/2014 | Dhar et al. |
| 2014/0349147 A1 | 11/2014 | Shaffer, II et al. |
| 2015/0132668 A1 | 5/2015 | Oi |
| 2015/0140376 A1 | 5/2015 | Shaffer, II et al. |
| 2016/0111755 A1 | 4/2016 | Liu |
| 2016/0197373 A1 | 7/2016 | Shaffer, II et al. |
| 2016/0380259 A1 | 12/2016 | Yang |
| 2017/0077545 A1 | 3/2017 | Shaffer, II |
| 2017/0244134 A1 | 8/2017 | Shaffer, II |
| 2017/0373298 A1 | 12/2017 | Kitoh et al. |
| 2018/0053926 A1 | 2/2018 | Shaffer, II et al. |
| 2018/0375145 A1 | 12/2018 | Ochiai |
| 2019/0379036 A1 | 12/2019 | Cadena |
| 2020/0091521 A1 | 5/2020 | Shaffer, II |

FOREIGN PATENT DOCUMENTS

| | | |
|---|---|---|
| CN | 1220289 C | 9/2005 |
| CN | 101202356 A | 6/2008 |
| CN | 101379652 A | 3/2009 |
| CN | 104538568 B | 4/2015 |
| DE | 2160868 A1 | 6/1973 |
| DE | 3822462 C1 | 11/1989 |
| DE | 19608326 A1 | 9/1997 |
| DE | 10058381 A1 | 6/2002 |
| DE | 102004018619 A1 | 11/2005 |
| EP | 0402265 B1 | 3/1995 |
| EP | 0631338 A | 4/2000 |
| EP | 1329973 A1 | 7/2003 |
| EP | 1418638 A2 | 5/2004 |
| EP | 1419549 A1 | 5/2004 |
| EP | 1986250 A1 | 10/2008 |
| EP | 2017918 A1 | 1/2009 |
| EP | 2273580 A2 | 1/2011 |
| EP | 2405524 A1 | 1/2012 |
| EP | 2471129 B1 | 7/2012 |
| EP | 2645450 A1 | 10/2013 |
| EP | 2696395 A1 | 2/2014 |
| EP | 3196964 A1 | 7/2017 |
| EP | 3316353 A1 | 5/2018 |
| FR | 55043 E | 6/1951 |
| JP | S51-069142 A | 6/1976 |
| JP | 55-024321 | 2/1980 |
| JP | S59-121787 A | 7/1984 |
| JP | S59-138076 A | 8/1984 |
| JP | S59-196560 A | 11/1984 |
| JP | S60189867 A | 9/1985 |
| JP | S62-229772 A | 10/1987 |
| JP | H02-174052 A | 7/1990 |
| JP | H03-088263 A | 4/1991 |
| JP | H06314567 A | 11/1994 |
| JP | H07-057768 A | 3/1995 |
| JP | H09-045363 A | 2/1997 |
| JP | H11-514132 A | 11/1999 |
| JP | 2000243403 A | 9/2000 |
| JP | 2000-340265 A | 12/2000 |
| JP | 2003-249259 A | 9/2003 |
| JP | 2004-095402 A | 3/2004 |
| JP | 2004-158343 A | 6/2004 |
| JP | 2005-032642 A | 2/2005 |
| JP | 2005-056761 A | 3/2005 |
| JP | 2005-064208 A | 3/2005 |
| JP | 2005-251465 A | 9/2005 |

(56) References Cited

FOREIGN PATENT DOCUMENTS

| | | |
|---|---|---|
| JP | 2005-259379 A | 9/2005 |
| JP | 2007-012596 | 1/2007 |
| JP | 2007-242593 A | 9/2007 |
| JP | 2009-164146 A | 7/2009 |
| JP | 2009-252548 A | 10/2009 |
| JP | 2010-251159 A | 11/2010 |
| JP | 2010-277862 A | 12/2010 |
| JP | 2011-009039 A | 1/2011 |
| JP | 2012-234823 A | 11/2012 |
| JP | 2014-534582 A | 12/2014 |
| JP | 5333576 B2 | 11/2016 |
| JP | 2017-508241 A | 3/2017 |
| JP | 2019-087414 A | 6/2019 |
| KR | 10-0194913 | 6/1999 |
| KR | 10 2001-0072859 A | 7/2001 |
| KR | 10-2001-0097437 | 11/2001 |
| KR | 10-2003-0059930 | 7/2003 |
| KR | 10-2005-0020036 | 6/2005 |
| KR | 10-2010-0033831 A | 3/2010 |
| KR | 10 2015 0013272 A | 2/2015 |
| RU | 2030034 C1 | 2/1995 |
| WO | 1993/01624 A1 | 1/1993 |
| WO | 1994/007272 A1 | 3/1994 |
| WO | 1994/029911 A1 | 12/1994 |
| WO | 1999/63611 A1 | 12/1999 |
| WO | 2001/003224 A1 | 1/2001 |
| WO | 2003/007415 A1 | 1/2003 |
| WO | 2006/105187 A1 | 10/2006 |
| WO | 2007/132621 A1 | 11/2007 |
| WO | 2010/085474 A1 | 7/2010 |
| WO | 2010/100979 | 9/2010 |
| WO | 2011/109683 A1 | 9/2011 |
| WO | 2013/062623 A1 | 4/2012 |
| WO | 2017/136545 A1 | 8/2017 |
| WO | 2018/115836 A1 | 6/2018 |
| WO | 2018/213730 A2 | 11/2018 |
| WO | 2018/237381 A | 12/2018 |
| WO | 2020/102677 A1 | 5/2020 |
| WO | 2020/243093 A1 | 12/2020 |
| WO | 2021/188583 A1 | 9/2021 |

OTHER PUBLICATIONS

JP Notification of Reasons for Refusal dated Jan. 13, 2023, Application No. 2021-569866.
Written Opinion for Application No. PCT/US2020/034555, dated May 26, 2020.
JP Refusal Notification dated Aug. 24, 2023, Application No. 2021-569866.

* cited by examiner

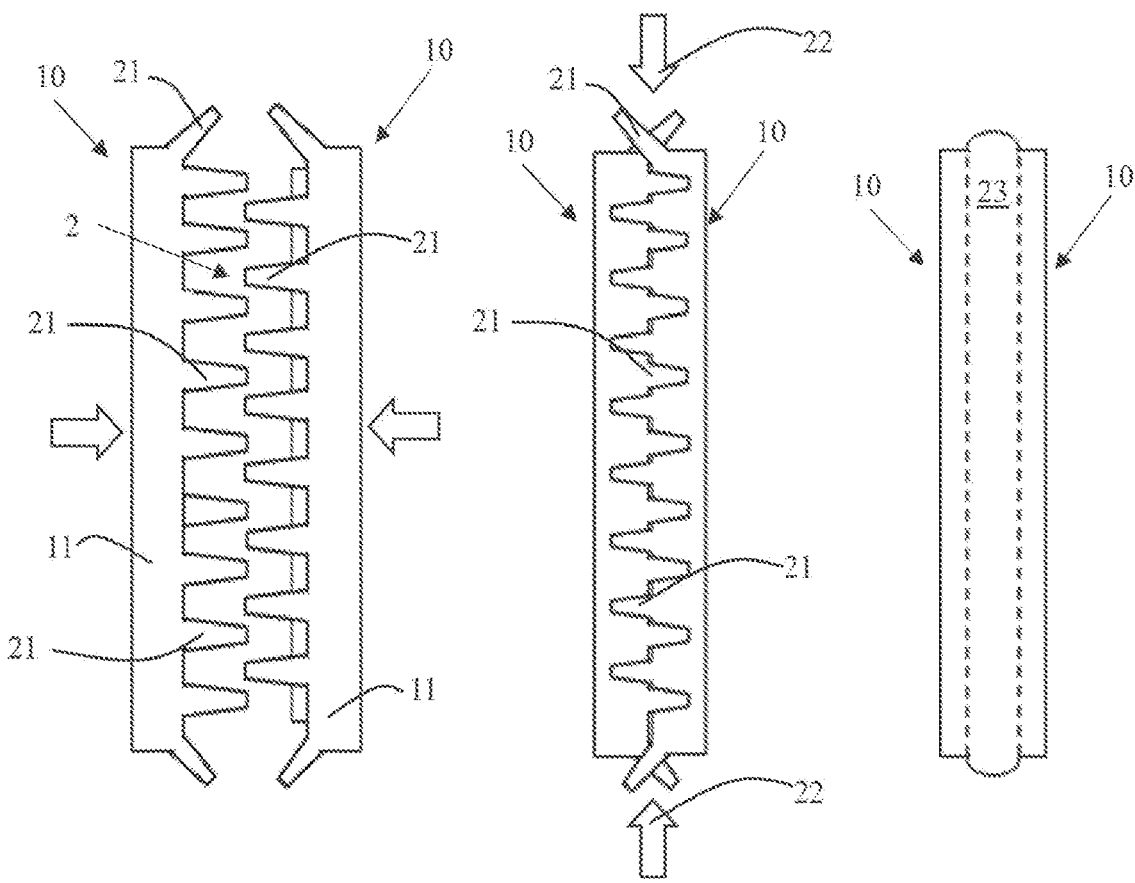
*FIG.-3A*  *FIG.-3B*  *FIG.-3C*
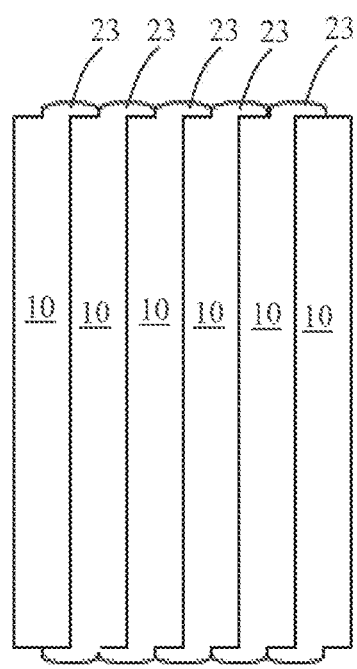
*FIG.-3D*

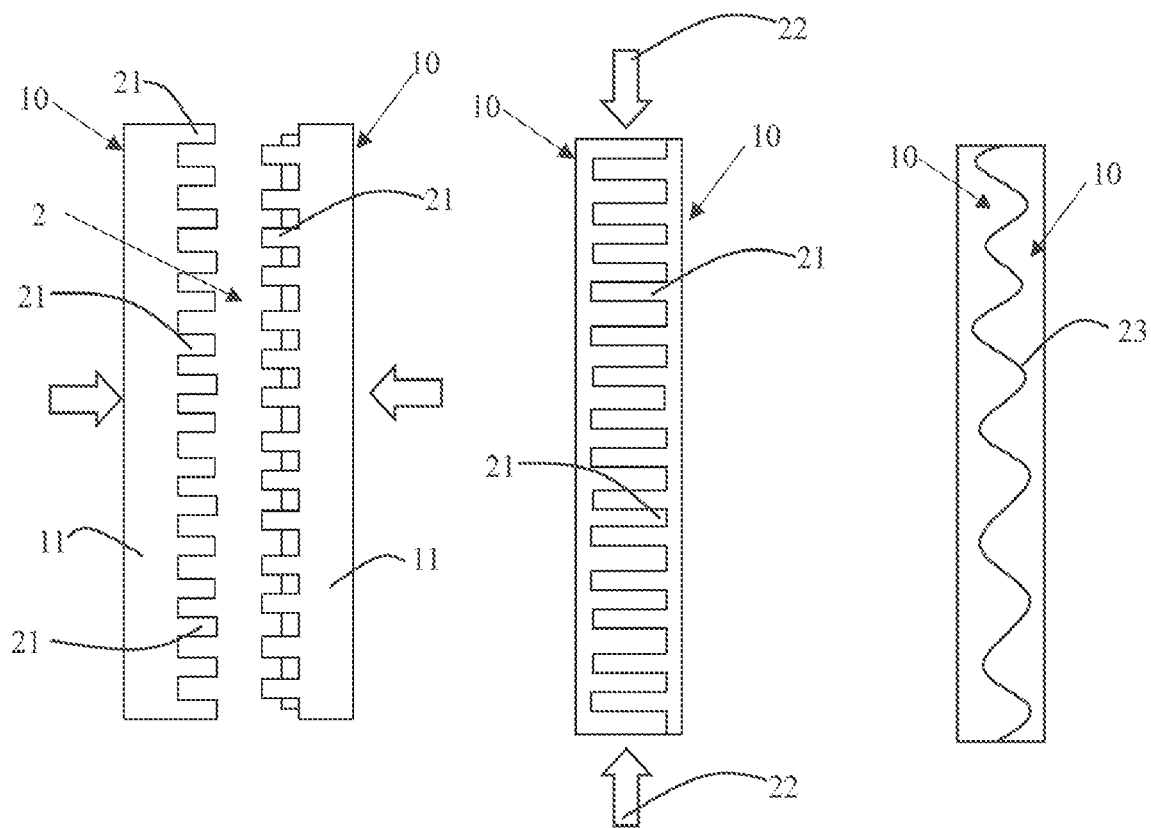
*FIG.-4A*  *FIG.-4B*  *FIG.-4C*
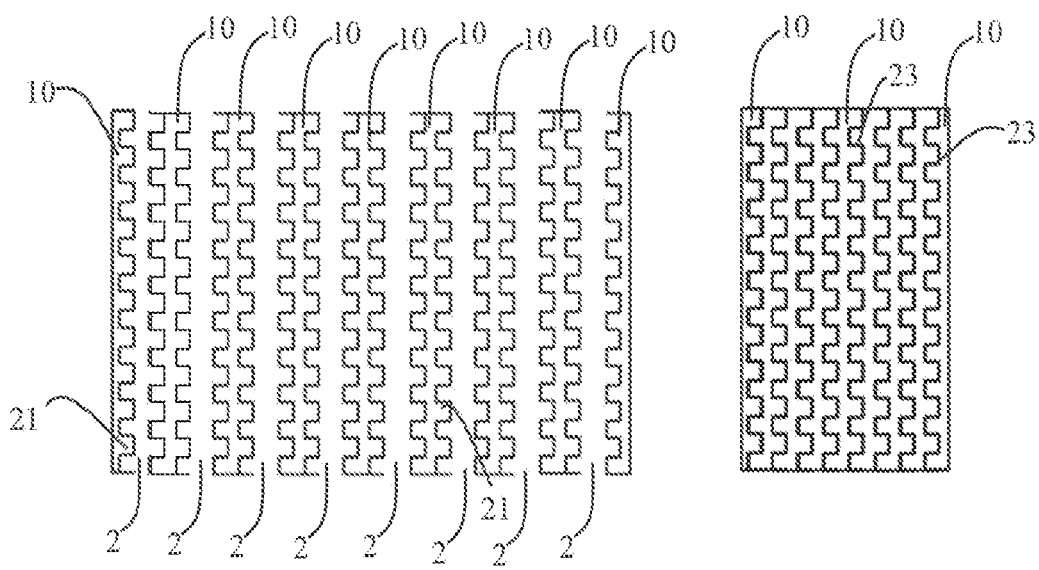
*FIG.-4D*  *FIG.-4E*

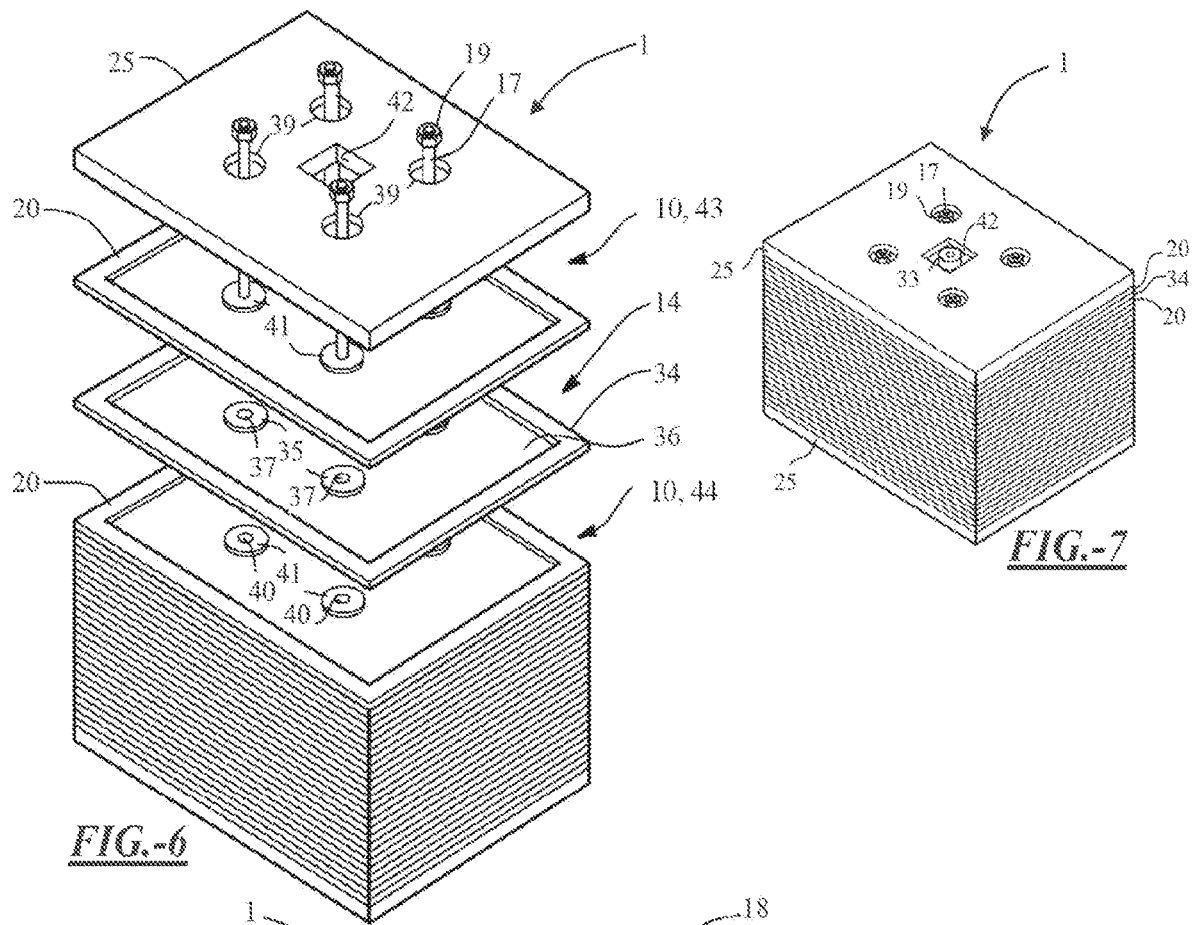
FIG.-6
FIG.-7
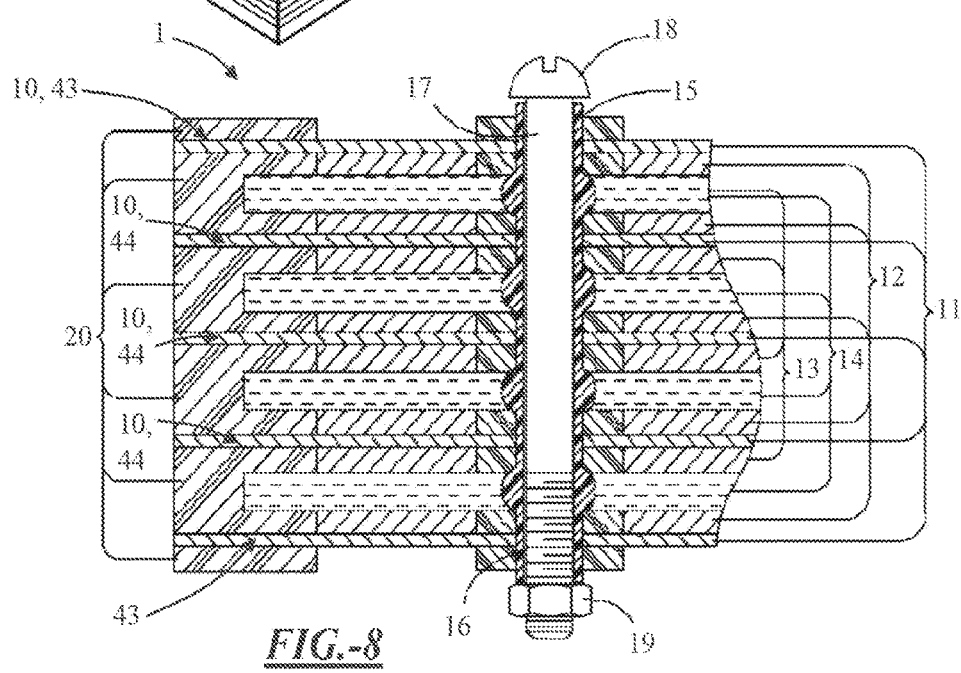
FIG.-8

BATTERY ASSEMBLY WITH INTEGRATED EDGE SEAL AND METHODS OF FORMING THE SEAL

FIELD

The present disclosure relates generally to stackable battery plates useful in bipolar battery assemblies and methods for the preparation of such assemblies. The present disclosure may find particular use in the preparation of stackable battery plates by providing an integrated seal about the periphery of a stack of battery plates while eliminating the use of an external membrane or casing.

BACKGROUND

Bipolar battery assemblies are typically formed as stacks of adjacent electrochemical cells. Typically, bipolar batteries comprise a number of bipolar plates and two monopolar end plates. The battery plates are arranged in a stack such that anodic material of one plate faces cathodic material of the next plate. In most assemblies, there are battery separators located between the adjacent plates, which allow an electrolyte to flow from cathodic material to the anodic material. Disposed in the space between the plates is an electrolyte, which is a material that allows electrons and ions to flow between the anodic and cathodic material. The adjacent surfaces of the bipolar plates with the separator and the electrolyte disposed between the plates form an electrochemical cell where electrons and ions are exchanged between the anodic material and the cathodic material. Some challenges presented by stacking battery plates to form adjacent electrochemical cells is preventing flow of electrolyte out of the cell, maintaining a seal about the electrochemical cells before operation of the battery assembly (e.g., pulling a vacuum, filling with electrolyte which may cause the battery plates to bow inward), and maintaining a seal about the electrochemical cells during operation of the battery assembly when there is a tendency for the battery assembly to bulge outward due to internal pressures.

Some bipolar battery assemblies may use a solid electrolyte to reduce the need for sealing about the battery assembly. While the use of solid electrolyte may resolve concerns with leaking, solid electrolyte generally does not perform as well as liquid electrolyte. As an example, solid electrolyte cannot achieve a high conductivity equal to or greater than that of a liquid electrolyte.

Other bipolar battery assemblies may adhere battery plates together at adjacent surfaces which face toward one another. For example, battery plates may be bonded at the generally planar and abutting frame surfaces, such as the battery assembly of US 2017/0373298. The bond may be provided by separate adhesives or other bonding methods. Problems with such seal designs include maintaining the bond between the frame surfaces before and during operation of the battery assembly and cooperating with a liquid electrolyte.

Another known manner of sealing the electrochemical cells is the use of membrane, casing, or both about the periphery of the stack. The membrane, casing, or both may prevent leaking of the electrolyte from within the electrochemical cell to outside of the battery plates, from the battery assembly to the outside environment, or both. The membrane, casing, or both may also apply compressive forces to the battery assembly during operation. The compressive forces may aid in maintaining a seal about the electrochemical cells by resisting outward bulging during operation. The membrane, casing, or both may be molded onto, adhered to, or located about the periphery of a battery assembly (i.e., exterior of the stack of battery plates) so that the battery assembly is enclosed. The membrane or casing may be formed as one-piece or multiple pieces such as a plurality of exterior frames about the battery plates. Some battery assemblies may even require a combination of solid electrolyte, individual seals about individual electrochemical cells, membranes, and casings to prevent leakage of the electrolyte. For example, US 2017/0373298, WO1993/001624, WO2010/100979, WO 2013/062623, EP2273580A2, JP2011-265693, JP2005-064208, and JP2009-252548 teach varying outer casings and membranes disposed about battery assemblies. Notwithstanding the above, there is still a need for developing a manner to seal about electrochemical cells which does not require additional seals, membranes, casings, or other materials. Elimination of a separate seal reduces part complexity, reduces assembly processes, simplifies overall assembly, and reduces the overall cost.

What is needed is a seal which can be integrated into one or more components of a battery assembly to seal about a periphery of electrochemical cells. What is needed is a seal which can be formed as part of one or more battery plates of a battery assembly. What is needed is a seal which can withstand contact to electrolyte and maintain a seal about the electrolyte. What is needed is a seal which can be integral with one or more battery plates and is able to resist inward and outward deformation of the one or more battery plates prior to and during operation of the battery assembly. What is needed is a seal which can be easily integrated into the manufacturing process that lessens complexity and cost while still maintaining an effective seal about a liquid electrolyte.

SUMMARY

The present disclosure relates to a method of forming a battery assembly including: a) stacking a plurality of battery plates to form a plurality of electrochemical cells; and b) welding about peripheral edges of the plurality of battery plates to form one or more integrated edge seal.

The present disclosure relates to a method for forming a battery assembly including: a) stacking a plurality of battery plates to form a plurality of electrochemical cells, wherein one or more individual battery plates include one or more projections extending from an exterior periphery of the battery plate toward an adjacent battery plate, and wherein upon stacking, the one or more projections of the one or more individual battery plates overlap about an exterior of the adjacent battery plate; b) welding about the exterior periphery of the plurality of battery plates to form one or more integrated edge seals, and wherein the integrated edge seal is formed by the one or more projections bonding to the adjacent battery plate.

The present disclosure relates to a battery assembly having one or more integrated edge seals about one or more electrochemical cells.

The method, battery assembly, or both of the present disclosure may include one or more of the following features in any combination: the method may be free of disposing a casing, a membrane, or both about the plurality of battery plates; the method may be free of including additional material separate from the battery plates to form the one or more integrated edge seals; the welding may be a heat weld, solvent weld, the like, or a combination thereof; the weld may be the heat weld; heat may be applied via platen, hot gas, hot liquid, infrared, laser, friction, vibration, ultrasonic induction wire loop, radio frequency, the like, or any combination thereof; one or more individual battery plates of the plurality of battery plates may include one or more projections projecting from an exterior periphery; one or more projections of one battery plate may be configured to mate with one or more other projections from an adjacent battery plate; the stacking of the plurality of battery plates may include mating the one or more projections of the one battery plate with the one or more other projections of the adjacent battery plate; mating of the one or more projections with one or more other projections may include aligning reciprocally, interlocking, intertwining, meshing, the like, or a combination thereof; the one or more projections of one battery plate may be configured to overlap an exterior surface of an adjacent battery plate; the stacking of the plurality of battery plates may include overlapping the one or more projections of the one battery plate with the exterior surface of the adjacent battery plate; the one or more projections may be fingers, teeth, peripheral lips, the like, or any combination thereof; the one or more projections melt together; the one or more projections may melt together to form the one or more integrated edge seals; the one or more projections may form a snap-lock with the one or more other projections; the integrated edge seal may form a liquid tight seal about the plurality of electrochemical cells; the integrated edge seal may form a gas tight seal about the plurality of electrochemical cells; the battery may be a bipolar battery; the method may include forming one or more substrates having one or more projections; the one or more substrates may include a frame about a periphery of each substrate; the one or more projections may project from the frame; the method may include forming the plurality of battery plates by disposing one or more active materials on the substrate; the one or more active materials may be located on the substrate within a frame, the one or more projections, or both; the method may include placing a current collector on the substrate and the active material may then disposed on the current collector; the one or more active materials may be a positive material, negative material, or both; the active material may be a positive active material which may form a cathode; the active material may be a negative active material which may form an anode; the battery plate may be a monopolar plate, bipolar plate, dual polar plate, or a combination thereof; a separator may be located between pairs of adjacent battery plates; an electrolyte may be located between pairs of adjacent battery plates to form individual electrochemical cells; the electrolyte may be a liquid electrolyte; the plurality of battery plates may include one or more bipolar plates having a first active material disposed on a current collector on a first surface of a substrate which functions as an anode and a second active material disposed on another current collector on a second, opposing surface of the substrate which functions as a cathode, a first monopolar plate having a first active material disposed on a current collector on a first surface of a substrate which functions as an anode opposite a surface of the substrate free of active material, a second monopolar plate having a second active material disposed on a current collector on second surface of a substrate which functions as a cathode opposite a surface of the substrate free of active material; the plurality of battery plates may include one or more dual polar plates having an active material disposed on a current collector on a first surface of a substrate and the active material disposed on another current collector on the second, opposing surface of the substrate, and the active material and the current collector of each surface of the substrate may function as a cathode or an anode; a liquid electrolyte may be disposed between each pair of battery plates which are adjacent; wherein the liquid electrolyte may function with the anode and the cathode located in a space between the pair of battery plates to form one of the electrochemical cells; and/or a separator may be located within each electrochemical cell.

The disclosure provides for an integrated edge seal which is integral with one or more components of a battery assembly. The integrated seal is able to provide a liquid and/or gas tight seal about the periphery of one or more electrochemical cells of the battery assembly. An integrated edge seal may be formed by one or more projections. The one or more projections may extend from one or more battery plates, separators, or both. The one or more projections may mate, engage, and even bond with one or more other components of the battery assembly to form the integrated edge seal. The one or more projections, integrated edge seal, or both may be formed of the same material as one or more substrates of a battery plate, separator, or both such that the projections, seal, or both are able to withstand contact with the electrolyte and maintain a seal about the electrolyte. The one or more integrated edge seals may bond two or more adjacent battery plates. Upon being bonded (e.g., melt-bonded), the integrated edge seal may be able to resist inward and outward deformation of the one or more battery plates prior to and during operation of the battery assembly.

BRIEF DESCRIPTION OF DRAWINGS

FIG. 3A illustrates a pair of adjacent battery plates having finger-like projections.
FIG. 3B illustrates a pair of adjacent battery plates interlocked together about an electrochemical cell.
FIG. 3C illustrates a pair of adjacent battery plates having an integrated edge seal about an electrochemical cell.
FIG. 3D illustrates a stack of battery plates having integrated edge seals about a plurality of electrochemical cells.
FIG. 4A illustrates a pair of adjacent battery plates having tooth-like projections.
FIG. 4B illustrates a pair of adjacent battery plates meshed together about an electrochemical cell.
FIG. 4C illustrates a pair of adjacent battery plates melt-bonded together forming an integrated edge seal about an electrochemical cell.
FIG. 4D illustrates an exploded view of a stack of battery plates having tooth-like projections off-set from one another.
FIG. 4E illustrates a stack of battery plates meshed with one another.
FIG. 6 illustrates a partially exploded view of a battery assembly.
FIG. 7 illustrates a perspective view of a battery assembly.
FIG. 8 illustrates a cross-sectional view of a battery assembly.

DETAILED DESCRIPTION

Figure 1A:
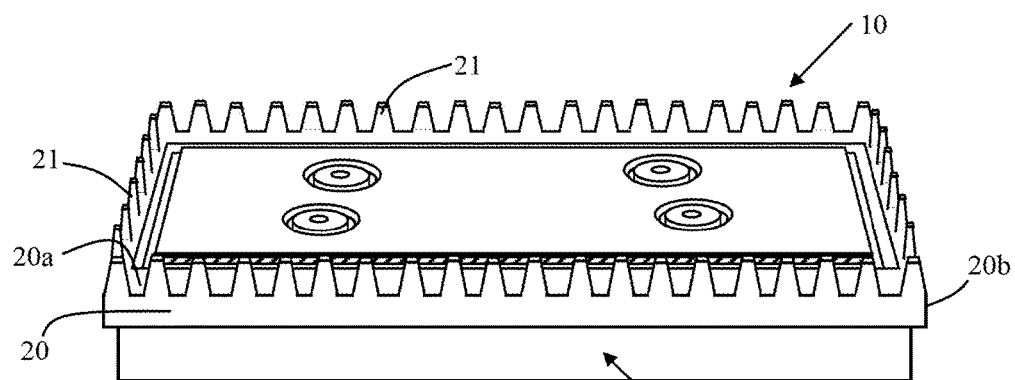
FIG. 1A is a perspective view of a battery plate.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Battery Plate(s)

The disclosure relates to battery plates useful in use as bipolar plates, monopolar plates, dual polar plates, the like, or any combination thereof. A battery plate may function as one or more electrodes, include one or more electroactive materials, be part of an electrochemical cell, form part of one or more sealing structures, or any combination thereof. A plurality of battery plates may function to conduct an electric current (i.e., flow of ions and electrons) within the battery assembly. A plurality of battery plates may form one or more electrochemical cells. For example, a pair of battery plates, which may have a separator and/or electrolyte therebetween, may form an electrochemical cell. The number of battery plates present can be chosen to provide the desired voltage of the battery. The battery assembly design provides flexibility in the voltage that can be produced. The plurality of battery plates can have any desired cross-sectional shape and the cross-sectional shape can be designed to fit the packaging space available in the use environment. Cross-sectional shape may refer to the shape of the plates from the perspective of the faces of the sheets. Flexible cross-sectional shapes and sizes allow preparation of the assemblies disclosed to accommodate the voltage and size needs of the system in which the batteries are utilized. Opposing end plates may sandwich a plurality of battery plates therebetween. The one or more battery plates may include one or more nonplanar structures.

A nonplanar structure may mean that the shape of a surface of the battery plates may be any shape in which the plates can function. A nonplanar structure may be any feature which projects from and/or caves into a planar portion of a battery plate. A nonplanar structure may mean that a battery plate may be a nonplanar battery plate. A nonplanar structure may include one or more indented surfaces and/or protruding surfaces with respect to any plane passing through the plates. One or more nonplanar structures may be shapes which are regular or irregular. The shapes may include one or more concave or convex surfaces. Included in nonplanar structures are rectangles, cylinders, hemisphere, pyramid, saw tooth, and the like. One or more nonplanar structures may include one or more inserts, bosses, frames, projections, openings, ribs, corrugated structures, or any combination thereof. The one or more nonplanar structures may function to form one or more seals, channels, or both. The one or more nonplanar structures may be part of a substrate. The one or more nonplanar structures may function to increase an overall surface area of a substrate, battery plate, or both. For example, a substrate having a corrugated surface may have a larger surface area than a substrate with a relatively planar surface. A larger surface area may allow for increased voltage, current, or both. The one or more nonplanar structures may be within any portion of a battery plate. Within a stack of battery plates, the planar and/or nonplanar structure of the battery plates may be the same so as to provide for efficient functioning of the electrochemical cells that they assist in forming. The plurality of battery plates may include one or more monopolar plates, one or more bipolar plates, or any combination thereof.

One or more battery plates may include one or more bipolar plates. The one or more bipolar plates may include a single or a plurality of bipolar plates. Plurality as used herein means that there are more than one of the plates. A bipolar plate comprises a substrate. The substrate may be in the form of a sheet having two opposing faces. Located on the opposing faces are a cathode and an anode. The cathode and the anode may be in the form of a paste applied onto the substrate, current collector, or both. The substrate may have a current collector located between the anode or cathode and the substrate. The cathode, the anode, or both may include a transfer sheet. The bipolar plates may be arranged in a battery assembly in one or more stacks so that the cathode of one bipolar plate faces the anode of another bipolar plate or a monopolar plate, and the anode of each bipolar plate faces the cathode of a bipolar or monopolar plate.

One or more battery plates may be one or more monopolar plates. The one or more monopolar plates may include a single or a plurality of monopolar plates. The one or more monopolar plates may include a monopolar plate located at each opposing end of a plurality of battery plates. Opposing monopolar plates may include one or more bipolar plates located therebetween. One or more monopolar plates may be located adjacent to, may be part of, or may be, one or more end plates. For example, each of the monopolar plates may be located between an adjacent end plate and an adjacent bipolar plate. One or more monopolar plates may be attached to one or more end plates. One or more monopolar end plates may be affixed to an end plate as taught in any of U.S. Pat. Nos. 8,357,469; 9,553,329; and US Patent Application Publication No. 2017/0077545; incorporated herein by reference in their entirety for all purposes. One or more monopolar end plates may include one or more reinforcement structures as disclosed in US Patent Application Publication No. 2017/0077545. One or more monopolar plates may be prepared from the same substrates, anodes, and cathodes used in one or more of the bipolar plates. One monopolar plate of a battery assembly may have a substrate with a cathode disposed thereon. One monopolar plate of a battery assembly may have a substrate with an anode disposed thereon. The cathode, anode, or both may be in the form of a paste applied onto the substrate. The cathode, the anode, or both may include a transfer sheet. A surface or side of a monopolar plate opposing the anode or cathode and/or facing an end plate may be a bare surface of a substrate.

One or more battery plates may include one or more dual polar plates. A dual polar battery plates may function to facilitate electrically connecting one or more stacks of battery plates with one or more other stacks of battery plates, simplify manufacturing and assembly of the two or more stacks, or both. Using dual polar plate stacks to electrically connect two or more stacks of battery plates may allow the individual stacks of battery plates to be formed as a standard size (e.g., number of plates and/or electrochemical cells) and then assembled to form the bipolar battery assembly; easily vary the number of individual stacks of battery plates to increase or decrease the power generated by the bipolar battery assembly; or both. The dual polar plates may include one or more substrates. One or more substrates may include a single substrate or a plurality of substrates. One or more substrates may include one or more conductive substrates, one or more non-conductive substrates, or a combination of both. A plurality of conductive substrates may include a first conductive substrate and a second conductive substrate. For example, a dual polar plate may comprise a first conductive substrate and a second conductive substrate with a nonconductive substrate located therebetween. As another example, the dual polar plate may comprise a nonconductive substrate. As another example, the dual polar plate may comprise a single conductive substrate. The one or more substrates of the dual polar plate include opposing surfaces. The opposing surfaces may have an anode, cathode, current conductor, current collector, or any combination thereof deposited and/or in contact with a portion of the surface. A conductive substrate of the dual polar plate may have an anode or cathode deposited on a surface or on both opposing surfaces. Having the same anode or cathode on the opposing surfaces may simplify manufacturing by requiring only one electrical connection (e.g., via a positive or negative current conductor) to another current conductor of the one or more stacks (e.g., a positive or negative current conductor or terminal of a monopolar plate). A substrate of the dual polar plate may have a current collector disposed on one or both opposing surfaces. The current collector may be disposed between the cathode or the anode and a surface of the substrate. Exemplary dual polar plates and integration into a battery assembly are disclosed in U.S. Pat. Nos. 9,685,677; 9,825,336; and US Patent Application Publication No.: 2018/0053926; incorporated herein by reference in their entirety for all purposes.

One or more battery plates include one or more substrates. One or more substrates may function to provide structural support for the cathode and/or the anode; as a cell partition, so as to prevent the flow of electrolyte between adjacent electrochemical cells; cooperating with other battery components to form an electrolyte-tight seal about the battery plate edges, which may be on the outside surface of the battery; and, in some embodiments, to transmit electrons from one surface to the other. The substrate can be formed from a variety of materials depending on the function or battery chemistry. The substrate may be formed from materials that are sufficiently structurally robust to provide the backbone of a desired battery plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate may be formed from an electrically conductive material, e.g., a metallic material, or can be formed from an electrically non-conductive material. Exemplary non-conductive material may include polymers, such as thermoset polymers, elastomeric polymers, or thermoplastic polymers, or any combination thereof. The substrate may comprise a generally non-electrically conductive substrate (e.g., a dielectric substrate). The non-conductive substrate may have electrically conductive features constructed therein or thereon. Examples of polymeric materials that may be employed include polyamide, polyester, polystyrene, polyethylene (including polyethylene terephthalate, high density polyethylene and low-density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). Composite substrates may be utilized. The composite may contain reinforcing materials, such as fibers or fillers commonly known in the art; two different polymeric materials, such as a thermoset core and a thermoplastic shell or thermoplastic edge about the periphery of the thermoset polymer; or conductive material disposed in a non-conductive polymer. The substrate may comprise or have at the edge of the plates a thermoplastic material that is bondable, preferably melt bondable. The one or more substrates may have one or more nonplanar structures. The one or more nonplanar structures may be integral with the substrate or affixed to the substrate. The one or more nonplanar structured may be molded as part of the substrate. The one or more nonplanar structures may include one or more raised edges, frames, inserts, projections, openings, the like, or any combination thereof.

One or more substrates may have a raised edge about the periphery so as to facilitate stacking of the battery plates and formation of electrochemical cells. The raised edge as used in this context means a raised edge on at least one of the two opposing surfaces of the plates. The raised edge may comprise a thermoplastic edge portion formed about another substrate material. The raised edge may function as separator plates as described herein. The substrate or periphery of the substrate may be a non-conductive material and may be a thermoplastic material. One or more substrates may include a frame. The frame may or may not include the raised edge. The frame may refer to the raised edge. The frame may be about a periphery of a substrate. The frame may be affixed to and/or integral with the substrate. The frame may be comprised of non-conductive material, such as a thermoplastic material. The use of non-conductive material enhances sealing the outside of the battery stack. The frame may include one or more assembly aids formed therein. The assembly aids may function to help align and retain one or more substrates, separators, or both in place while stacking to form the battery assembly. The assembly aids may include one or more projections, indentations, or both. For example, one or more male projections from one surface of a frame may align and sit within one or more female wells of a frame of an adjacent substrate and/or separator. The one or more female wells of a frame may be located on an opposite surface of the frame as the one or more male projections. The frame may be used to form an integrated edge seal. One or more frames may include one or more projections useful for forming one or more integrated edge seals.

One or more of the battery plates may include one or more projections. The one or more projections may function to engage and/or mate with one or more other projections, mate with another (e.g., adjacent) battery plate, align the battery plate during assembly into a stack of battery plates, form a seal about one or more electrochemical cells, or a combination thereof. The one or more projections may have any suitable size, shape, and/or configuration needed to function. The one or more projections may be formed as one or more raised edges, lips, tabs, fingers, teeth, posts, undulations, wells, the like, or any combination thereof. The one or more projections may extend from any surface of a battery plate. The one or more projections may extend from an exterior surface, interior surface, or both of a battery plate. The one or more projections may extend from an exterior periphery of a battery plate. The one or more projections may extend from a frame, raised edge, substrate, any other portion of a battery plate, or any combination thereof. The one or more projections may extend from an exterior surface of a frame, an inner facing surface of a frame, or both. The one or more projections may extend at any angle relative to a portion of a battery plate such that the projections may engage, mate, contact, overlap, or any combination thereof with one or more other projections, exterior surfaces, frames, raised edge, substrate, or any combination thereof. Upon stacking, one or more projections of an individual battery plate may overlap about an exterior of an adjacent battery plate. Such as upon stacking to form an electrochemical cell. The one or more projections may extend toward an adjacent battery plate. The one or more projections may extend at an angle relative to the substrate. The one or more projections may extend at an angle which is generally acute, perpendicular, or even obtuse relative to the substrate. The one or more projections may be deformed such that the angle is changed. For example, the one or more projections may be deformed upon the application of heat such that the angle relative to the substrate is reduced. The one or more projections may extend from one or more sides of a battery plate. The one or more projections may extend about one side, two sides, three sides, four sides, or any other number of sides of a battery plate. The one or more projections may extend about one, some, or all sides of a battery plate. The one or more projections may be made from any material suitable for one or more substrates, raised edges, frames, the like, or a combination thereof. For example, the one or more projections may be comprised of a thermoplastic material. The thermoplastic material may be bondable, such as melt bondable. The one or more projections may be continuous about a battery plate, may be spaced about the battery plate, or both. Continuous may be about an entire periphery of a battery plate. For example, the one or more projections may include a peripheral lip extended from a frame or substrate about the entire periphery of the battery plate. Spaced about a battery plate may mean a plurality of projections are distributed about a periphery of a battery plate. For example, the one or more projections may include a plurality of tabs evenly or unevenly distributed about a periphery of a battery plate. As another example, the one or more projections may include a plurality of teeth evenly or unevenly distributed about a periphery of a battery plate. The one or more projections may be attached to, integrated to, or both the one or more battery plates. The one or more projections may be attached to, integral with (e.g., formed therewith), or both one or more frames, raised edges, substrates, any other portion of a battery plate, or any combination thereof. For example, the one or more projections may be integrally formed to a frame which is also integrally formed with a substrate, such that the one or more projections are integrally formed with the substrate.

The one or more projections may cooperate with one or more other projections, frames, substrates, exterior surfaces, or any combination thereof to form one or more integrated edge seals; seal one or more electrochemical cells; or any combination thereof. The one or more projections may have any suitable size and/or configuration to engage with one or more other projections, battery plates, separators, the like, or any combination thereof. The one or more projections may have a length suitable for overlapping with an adjacent battery plate, separator, or both. The one or more projections may have a length, depth, or both suitable for mating with one or more other projections. For example, one or more projections may have one or more wells which have as similar length as one or more teeth of one or more other projections. The one or more projections may engage and/or mate with one or more other projections of an adjacent battery plate, separator, or both. For example, stacking a plurality of battery plates may include mating one or more projections of one battery plate with one or more other projections of an adjacent battery plate. The one or more projections may be offset, aligned, or both relative to one or more other projections. For example, one or more projections if one battery plate may be offset from one or more other projections of another battery plate. As another example, one or more projections of one battery plate may be aligned (e.g., centrally aligned) with one or more other projections of another battery plate. One or more projections may engage and/or mate with one or more other projections via being reciprocally aligned, intertwined, interlocked, meshed, overlapping, snap-fit, the like, or any combination thereof. For example, projections formed as teeth of one battery plate may engage with projections formed as teeth of an adjacent battery plate. One or more projections may engage and/or mate with one or more exterior surfaces by overlapping, abutting, friction-fit, snap-fit (e.g., snap-lock), the like, or any combination thereof. For example, one or more projections formed as a peripheral lip extending from about a periphery of one battery plate may receive a periphery of an adjacent battery plate with a snap-fit connection. The one or more projections may be bonded to one or more other projections. Bonding may be via the same material as part of the projections, a separate adhesive, or both. Bonded may be performed by welding. Bonding may include melt-bonding. Melting one or more projections with one or more other projections may integrally attach one or more battery plates to one or more other battery plates, separators, or both. The one or more projections may melt together, with an exterior surface, or both to form the one or more integrated edges. Melting one or more projections to one or more other projections may form one more integrated edge seals about one or more electrochemical cells.

The one or more projections may be part of one or more separators. The one or more features of the projections relative to a separator may be the same or similar as relative to one or more battery plates.

One or more of the battery plates may include one or more active materials. The one or more active materials may function as a cathode or an anode of the battery plate. The one or more active materials may be any form commonly used in batteries to function as an anode, cathode, or both. A bipolar plate may have one or more active materials on a surface functioning as a cathode and one or more active materials on an opposing surface functioning as an anode. A monopolar plate may have one or more active materials on a surface functioning as a cathode or an anode while the opposing surface is bare of both an anode and cathode. A dual polar plate may have one or more active materials on a surface functioning as a cathode or an anode, while one or more similar active materials are on the opposing surface also functioning as a cathode or an anode. The cathode of one battery plate may be opposing the anode of another battery plate. The cathode may be referred to as one or more positive active materials (PAM). The anode may be referred to as one or more negative active materials (NAM). The one or more active materials may include any suitable active material which facilitates an electrochemical reaction with the electrolyte, the opposing one or more active materials, or both of the same electrochemical cell. The one or more active materials may be selected to have a reduction and/or oxidation reaction with the electrolyte. The one or more active materials may comprise one or more materials typically used in secondary batteries, including lead acid, lithium ion, and/or nickel metal hydride batteries. The one or more active materials may comprise a composite oxide, a sulfate compound, or a phosphate compound of lithium, lead, carbon, or a transition metal. Examples of the composite oxides include Li/Co based composite oxide, such as $LiCoO_2$; Li/Ni based composite oxide, such as $LiNiO_2$; Li/Mn based composite oxide, such as spinel $LiMn_2O_4$, and Li/Fe based composite materials, such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, AgO, NiOOH, and the like. For example, in a lead acid battery, the one or more active materials may be or include lead dioxide ($PbO_2$), tribasic lead oxide (3PbO), tribasic lead sulfate ($3PbO \cdot 3PbSO_4$), tetrabasic lead oxide (4PbO), tetrabasic lead sulfate ($4PbO \cdot 4PbSO_4$), or any combination thereof. The one or more active materials may be in any form which allows the one or more active materials to function as a cathode, anode, or both of an electrochemical cell. Exemplary forms include formed parts, in paste form, pre-fabricated sheet or film, sponge, or any combination thereof. For example, one or more active materials may include a sponge lead. Sponge lead may be useful due to its porosity. One or more of the active materials may be porous. Porosity may be advantageous in providing an increased surface area. A larger surface area may reduce the distance ions travel, thus increasing the power and energy density of one or more active materials. One or more active materials may have a lower, about equal, or higher pore surface area compared to one or more other active materials. Paste form of one or more active materials of at least one of the anode or cathode of an electrochemical cell may be particularly advantageous as it may allow for easy application of a plurality of active materials, forming of non-planar shapes, adapting to non-planar substrates, easily having one active material be distinct from another, allowing one or more non-active materials to be located therein, or any combination thereof. The one or more active materials may include one or more additives which may be beneficial in providing or improving reinforcement, stability, conductivity, or a combination thereof. One or more additives may include floc or glass fibers for improved reinforcement. One or more additives may include various ligano-organic compounds for paste stability. One or more additives may include carbon, non-carbon, non-silicon oxide, nano-titanium oxide, nano-polymers, the like, or a combination thereof for improved conductivity. The one or more active materials selected for use in an anode and cathode may be selected to cooperate together to function as an electrochemical cell once a circuit is formed which includes the electrochemical cells. The one or more active materials may be disposed on a substrate, a current collector or both. A method of forming a battery plate and/or battery assembly may include disposing one or more active materials on a substrate. The one or more active materials may be located within a frame, raised edges, one or more projections, the like, or a combination thereof. Within may be defined as within a periphery defined by the frame, raised edges, projections, the like, or a combination thereof while being disposed on a surface of a substrate.

Battery Assembly

A battery assembly may be formed by stacking a plurality of battery plates to form a plurality of electrochemical cells. The battery plates may include one or more of the battery plates according to the present teachings. A battery assembly may include one or more electrochemical cells. An electrochemical cell may be formed by a pair of opposing battery plates with an opposing anode and cathode pair therebetween. The space of an electrochemical cell (i.e., between an opposing anode and cathode pair) may contain one or more separators, transfer sheets, electrolyte, or a combination thereof. One or more electrochemical cells may be sealed. The electrochemical cells may be sealed through one or more seals formed about one or more channels; one or more frames and/or edges of battery plate, separators, or both; one or more integrated edge seals; or any combination thereof which may form closed electrochemical cells. The periphery of the electrochemical cells may be sealed by one or more integrated edge seals. The one or more integrated edge seals may provide a liquid tight seal, gas tight seal, or both about one or more electrochemical cells. The closed electrochemical cells may be sealed from the environment to prevent leakage and short circuiting of the cells.

A battery assembly may include an electrolyte. The electrolyte may allow electrons and ions to flow between the anode and cathode. The electrolyte may be located within the electrochemical cells. As the one or more electrochemical cells may be sealed, the electrolyte may be a liquid electrolyte. The electrolyte can be any liquid electrolyte that facilitates an electrochemical reaction with the anode and cathode utilized. The electrolytes can be water based or organic based. The organic based electrolytes useful herein comprises an electrolyte salt dissolved in an organic solvent. In lithium ion secondary batteries, it is required that lithium be contained in the electrolyte salt. For the lithium-containing electrolyte salt, for instance, use may be made of $LiPF_6$, $LiClO_4$, $LiBF_4$, $LiAsF_6$, $LiSO_3CF_3$ and $LiN(CF_3SO_2)_2$. These electrolyte salts may be used alone or in combination of two or more. The organic solvent should be compatible with the separator, transfer sheet, cathode and anode, and the electrolyte salt. It is preferable to use an organic solvent that does not decompose even when high voltage is applied thereto. For instance, it is preferable to use carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic esters such as 1,3-dioxolane and 4-methyldioxolane; lactones such as γ-butyrolactone; sulfolane; 3-methylsulfolane; dimethoxyethane, diethoxyethane, ethoxymethoxymethane and ethyldiglyme. These solvents may be used alone or in combination of two or more. The concentration of the electrolyte in the liquid electrolyte should preferably be 0.3 to 5 mol/l. Usually, the electrolyte shows the highest conductivity in the vicinity of 1 mol/l. The liquid electrolyte should preferably account for 30 to 70 percent by weight, and especially 40 to 60 percent by weight of the electrolyte. Aqueous electrolytes comprise acids or salts in water which enhance the functioning of the cell. Preferred salts and acids include sulfuric acid, sodium sulfate or potassium sulfate salts. The salt or acid is present in a sufficient amount to facilitate the operation of the cell. The concentration may be about 0.5 weight percent of greater based on the weight of the electrolyte, about 1.0 or greater or about 1.5 weight percent or greater. A preferred electrolyte in a lead acid battery is sulfuric acid in water. The electrolyte may be able to pass through one or more separators, transfer sheets, or both of an electrochemical cell. The electrolyte may be sealed from leaking to an exterior of a battery assembly by one or more integrated edge seals. One or more electrochemical cells may be filled with electrolyte after forming the one or more integrated edge seals.

The battery assembly may include one or more integrated edge seals. The one or more integrated edge seals function to provide a seal about one or more electrochemical cells, prevent separate of one or more battery plates and/or separators from one another, or both. The integrated edge seal may be particularly useful in forming a liquid tight seal, gas tight seal, or both about a plurality of electrochemical cells. The one or more integrated edge seals may be formed by one or more projections, battery plates, separators, or any combination thereof. The integrated edge seal may be formed about a portion or all of a periphery of an electrochemical cell. The integrated edge seal may be formed about the peripheral edge all about an electrochemical cell. The peripheral edge may be the joint and/or seam defined by adjacent battery plates, separators, or both which form an electrochemical cell. The one or more integrated edge seals may be comprised of any material suitable for being exposed to electrolyte. The one or more integrated edge seals may be formed by the same material suitable for one or more substrates, frames, raised edges, projections, separators, the like, or a combination thereof.

The integrated edge seal may be formed upon stacking one or more battery plates within one or more other battery plates, separators, or both. The one or more integrated edge seals may be formed by mating, engaging, and/or bonding one or more projections with one or more other projections, frames, raised edges, exterior surfaces, and/or the like of one or more adjacent battery plates, separators, or both. The integrated edge seal may be formed by any method suitable for bonding one or more projections with one or more other projections, exterior surfaces, frames, raised edges, substrates, or any other portion of a battery plate, separator, or both. Bonding may include using a separate adhesive, melt-bonding, or both. Bonding may be performed by any method of welding Welding may include heat welding, solvent welding, the like, or any combination. Welding may be achieved by heated platens, heat generated by friction or vibration, ultrasonic, radiofrequency, induction loop wire, solvent, the like, or any combination thereof. For example, heat may be applied via platen, hot gas, hot liquid, infrared, laser, friction, vibration, ultrasonic induction wire loop, radio frequency, the like, or any combination thereof. For example, forming a battery plate may include welding about an exterior periphery of the plurality of battery plates to form one or more integrated edge seals. Upon welding, the integrated edge seal may be formed by one or more projections bonding to an adjacent battery plate. One or more integrated edge seals may be free of material separate from the battery plates. For example, the one or more integrated edge seals may be formed by the one or more projections upon welding or other bonding and be free of any other seals or sealant material. The weld or other bonding method may provide for a continuous integrated seal about the periphery of one or more electrochemical cells. The weld or other bonding method may provide a mechanical strong seal about the periphery of the one or more electrochemical cells.

The battery assembly may include or be free of one or more separators. The one or more separators may function to partition an electrochemical cell (i.e., separate a cathode of an electrochemical cell from an anode of an electrochemical cell); prevent short circuiting of the cells due to dendrite formation; allow liquid electrolyte, ions, electrons or any combination of these elements to pass through; or any combination thereof. Any known battery separator which performs one or more of the recited functions may be utilized in the battery assemblies of the present teachings. One or more separators may be located between anode and a cathode of an electrochemical cell. One or more separators may be located between a pair of adjacent battery plates, which may include between bipolar plates or between a bipolar plate and a monopolar plate. The separator may be prepared from a non-conductive material, such as porous polymer films, glass mats, porous rubbers, ionically conductive gels or natural materials, such as wood, and the like. The separator may contain pores or tortuous paths through the separator which allows electrolyte, ions, electrons or a combination thereof to pass through the separator. Among exemplary materials useful as separators are absorbent glass mats (AGM), and porous ultra-high molecular weight polyolefin membranes and the like. The separators may be attached about their periphery and/or interior to one or more end plates, battery plates, other separators, or any combination thereof. The separators may receive one or more posts therethrough. For example, one or more posts extending through a stack of one or more end plates, one or more battery plates, and/or one or more separators may retain a stack of a plurality of battery plates and one or more separators together. The separators may have a cross-section or surface area that is greater than the area of the adjacent cathode and anode. A larger area may allow for isolation of the anode from the cathode of the same electrochemical cell. The separator may completely separate the cathode portion of the cell from the anode portion of the cell. The edges of the separator may contact peripheral edges of adjacent battery plates. The edges of a separator may contact and/or be located adjacent to one or more frames, projections, or both of a battery plate. The edges of the separator, battery plate, or both may not have an anode or cathode disposed thereupon, so as to completely separate the anode portion of the cell from the cathode portion of the cell. The application of the active material to a transfer sheet, and then the transfer sheet to the substrate may be particularly advantageous in ensuring the edges of the separator and battery plates are free of the active material. The use of one or more transfer sheets within an electrochemical cell may allow for the electrochemical cell to be free of a separator if desired.

One or more separators may include or be free of one or more frames. The frames may function to match with the edges or frames of adjacent battery plates and form a seal between the electrochemical cells and the outside of the battery. The frame may be attached to or integral with a separator. The frame can be attached to the separator about the periphery of the sheet forming the separator using any means that bonds the separator to the frame and which can withstand exposure to the electrolyte solution. For example, the frame may be attached by adhesive bonding, melt bonding or molding the frame about the periphery of the separator. The frame can be molded in place by any known molding technic, for example thermoforming, injection molding, roto molding, blow molding, compression molding and the like. The frame may be formed about the separator sheet by injection molding. The frame may contain a raised edge adapted to match raised edges disposed about the periphery of the substrates for the battery plates. Raised edges in one or both of the battery plate substrates and the frames of the separators can be matched to form a common edge for the battery stack and to enhance the seal between the electrochemical cells and the outside of the battery. To seal about edges of the plurality of battery plates and one or more separators to prevent leakage of an electrolyte and evolved gasses from the electrochemical cells, isolate the electrochemical cells to prevent short-circuiting, the article may be sealed using an endo or exoskeleton sealing system as disclosed in commonly owned US Patent Publication Nos. 2010/0183920, 2014/0349147, 2015/0140376, and 2016/0197373 incorporated in their entirety by reference. By being free of one or more frames, one or more separators may be able to be disposed within an interior of a battery plate. The interior may be defined by a frame, one or more projections, or both of the battery plate. By being free of one or more frames, one or more projections of a battery plate may better overlap an exterior surface of an adjacent battery plate, an integrated seal may be more easily formed, an integrated seal may have extend across a larger surface area of adjacent battery plates and provide a stronger seal, or any combination thereof.

The battery assembly may include one or more inserts. One or more inserts may include a plurality of inserts. The one or more inserts may function to interlock with one or more other inserts, define a portion of one or more channels passing through the stack, form leak proof seal along one or more channels, cooperate with one or more valves, or any combination thereof. One or more inserts may be part of one or more end plates, battery plates, separators, or any combination thereof. One or more inserts may be free of active material, transfer sheet, or both. The one or more inserts may have any size and/or shape to interlock with one or more inserts of a battery plate, end plate, separator, or combination thereof; form a portion of a channel, form a leak proof seal along one or more channels, cooperate with one or more valves, or any combination thereof. The one or more inserts may be formed or attached to an end plate, substrate of a battery plate, separator, or combination thereof. The one or more inserts may be located within the periphery of a battery plate, separator, end plate, or combination thereof. One or more inserts may project from a surface of a substrate, separator, end plate, or combination thereof thus forming one or more raised inserts. One or more inserts may project from a substrate of a battery plate, a central portion of a separator, or both. One or more inserts may project substantially orthogonally or oblique from a surface of the substrate, separator, end plate, or combination thereof. One or more inserts may be attached to or integral with a portion of the battery plate, separator, end plate, or combination thereof. An insert which is integral with and projects from a surface may be defined as a boss. The opposing surface from which the insert projects therefrom may have a reciprocal indentation to allow forming of the boss. The reciprocal indentation may receive another insert therein, thus allowing formation of a channel. The one or more inserts may have one or more openings therethrough. The one or more inserts may be concentric and formed about one or more openings One or more inserts may extend a length of an opening. A sealing surface may be formed between the outer diameter of one or more openings and an interior of one or more inserts. For example, a surface of the substrate, end plate, and/or separator may be substantially perpendicular to a longitudinal axis of the battery assembly located between an insert and an opening may be a sealing surface. One or more inserts may be capable of interlocking with one or more inserts of an adjacent battery plate, separator, and/or end plate to form a leak proof seal about a channel. For example, one or more battery plates may be machined or formed to contain matching indents, on a surface opposite from an insert, for bosses, inserts, sleeves, or bushings of a separator, battery plate, and/or end plate. The one or more inserts may pass through one or more nonplanar structures of one or more active materials, transfer sheets, or both. For example, one or more inserts may pass through an opening (e.g., void) of an active material and transfer sheet to allow interlocking with an adjacent insert. One or more suitable inserts may be those disclosed in U.S. Pat. Nos. 8,357,469; 9,553,329; and US Patent Application Publication No. 2017/0077545; incorporated herein by reference in their entirety for all purposes. One or more inserts may contain one or more vent holes. One or more inserts of one or more separators may contain one or more vent holes. The one or more vent holes may allow communication of selected fluids from one or more electrochemical cells to one or more channels. Each of the electrochemical cells may be independently electrochemically formed.

The battery assembly may include one or more openings. The one or more openings may include a plurality of openings. The openings may function to form one or more channels; house one or more seals; affix one or more end plates, battery plates, separators, or combination thereof to one another; or any combination thereof. The one or more openings may be formed in one or more of the end plates, battery plates, separators, active material, transfer sheets, or any combination thereof. One or more openings of an end plate, battery plate, separator, active material, transfer sheet, or combination thereof may align (i.e., be substantially concentric) with one or more openings of one or more other end plates, battery plates, separators, active material, transfer sheet, or any combination thereof. The one or more openings may align in a transverse direction across the length of the battery assembly. The transverse direction may be substantially parallel to a longitudinal axis of the article. The transverse direction may be substantially perpendicular the opposing surfaces of the substrates upon which a cathode and/or anode may be deposited. The openings may be machined (e.g., milled), formed during fabrication of the substrate (e.g., by a molding or shaping operation), or otherwise fabricated. Openings in a paste may be formed during a past application process. The openings may have straight and/or smooth internal walls or surfaces. The size and frequency of the openings formed in the substrate may affect the resistivity of the battery. The one or more openings may have a diameter able to receive a post therethrough. One or more openings in an active material and/or transfer sheet may have a diameter able to receive a post, an insert, or both therethrough. The openings may have a diameter of about 0.2 mm or greater, about 1 mm or greater, about 2 mm or greater, or even about 5 mm or greater. The openings may have a diameter of about 30 mm or less, about 25 mm or less, or even about 20 mm or less. One or more openings of a transfer sheet and/or active material (e.g., paste) may have a diameter larger than a diameter of an opening and/or insert of a separator, substrate, battery plate, end plate, or combination thereof. One or more openings of a battery plate and/or substrate may have a larger diameter than one or more other openings of the same battery plate and/or substrate. An opening may be about at least about 1.5 times, at least about 2 times, or even at least about 2.5 times larger than another opening. An opening may be about 4 times or less, about 3.5 times or less, or even about 3 times or less larger than another opening. The openings may be formed having a density of at least about 0.02 openings per $cm^2$. The openings may be formed having a density of less than about 4 openings per $cm^2$. The openings may be formed having a density from about 2.0 openings per $cm^2$ to about 2.8 openings per $cm^2$.

One or more openings may be filled with an electrically conductive material, e.g., a metallic-containing material. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium, or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., below about 230° C., below about 220° C., below 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the battery plate. An open circuit may operate to dramatically increase the resistance within the bipolar battery thereby stopping further electrical flow and shutting down unsafe reactions within the battery. Accordingly, the type of electrically conductive material selected fill the openings can vary depending on whether it is desired to include such an internal shut down mechanism within the battery, and if so at what temperature it is desired to effect such an internal shutdown. The substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled.

The battery assembly may include one or more channels. The one or more channels may function as one or more venting, filling, and/or cooling channels; house one or more posts; distribute one or more posts throughout an interior of the battery assembly; prevent liquid electrolyte from coming into contact with one or more posts or other components; or any combination thereof. The one or more channels may be formed by one or more openings of one or more end plates, battery plates, and/or separators, which are aligned. The one or more channels may extend through one or more openings of active material, transfer sheets, or both. The one or more channels may be referred to as one or more integrated channels. The one or more channels may pass through one or more electrochemical cells. The one or more channels may pass through a liquid electrolyte. The channels may be sealed to prevent electrolytes and gasses evolved during operation from entering the channels. Any method of sealing which achieves this objective may be utilized. One or more seals, such as inserts of the one or more end plates, battery plates, and separators, may interlock and surround one or more channels to prevent the liquid electrolyte from leaking into one or more channels. The one or more channels may pass through the battery assembly in a transverse direction to form one or more transverse channels. The size and shape of the channels can be any size or shape that allows them to house one or more posts. The shape of the channels may be round, elliptical, or polygonal, such as square, rectangular, hexagonal and the like. The size of the channels housing one or more posts is chosen to accommodate the posts used. The diameter of the channel may be equal to the diameter of the openings which align to form one or more channels. The one or more channels comprise a series of openings in the components arranged so a post can be placed in the channel formed, so a fluid can be transmitted through the channel for cooling, and/or for venting and filling. The number of channels is chosen to support the end plate and edges of the end plates, battery plates, and separators to prevent leakage of electrolyte and gasses evolved during operation, and to prevent the compressive forces arising during operation from damaging components and the seal for the individual electrochemical cells. A plurality of channels may be present so as to spread out the compressive forces generated during operation. The number and design of channels is sufficient to minimize edge-stress forces that exceed the fatigue strength of the seals. The locations of a plurality of channels are chosen so as to spread out the compressive forces generated during operation. The channels may be spread out evenly through the stack to better handle the stresses. The plurality of channels may have a cross-sectional size of about 2 mm or greater, about 4 mm or greater, or about 6 mm or greater. The upper limit on the cross-sectional size of the channels is practicality. If the size is too large, the efficiency of the assemblies is reduced. The channels may have a cross-sectional size of about 30 mm or less, about 25 mm or less, or even about 20 mm or less. A nonplanar surface of active material may allow for compensation or improved efficiency while the channels have a larger cross-sectional size. For example, a corrugated form of the active material may allow for the increased surface area and thus improved efficiency of the battery assembly.

The battery assembly may comprise a seal between one or more channels and one or more posts. One or more seals may be located in a channel, about an exterior of a channel, and/or about a post. The seal may comprise any material or form that prevents electrolyte and gasses evolved during operation from leaking from the electrochemical cells. The seal can be a membrane, sleeve, or series of matched inserts in the end plates, battery plates, and/or separators, or inserted in the channel. The membrane can be elastomeric. The channel can be formed by a series of sleeves, bushings, inserts and/or bosses, inserted or integrated into the plates and/or separators. The inserts and/or bosses may be compressible or capable of interlocking with one another to form a leak proof seal along the channel. The inserts and/or bosses may be formed in place in the battery plates and/or separators, such as by molding them in place. The inserts and/or bosses may be molded in place by injection molding. The seal can be prepared from any material that can withstand exposure to the electrolyte, operating conditions of the electrochemical cells and forces exerted by inserting the post or by the post in the channel. The preferred polymeric materials that are described as useful for the posts and the substrates. The seal may be formed by sleeves, inserts or bushings placed between the bipolar and monopolar plates. The sleeves or inserts can relatively rigid and the bushings will generally be elastomeric. The inserts, bosses, sleeves and/or bushings may be adapted to fit within indentations in the bipolar and monopolar plates and/or separators or to have ends that insert into the openings of the plates creating one or more channels. The dual polar, bipolar and monopolar plates can be formed or machined to contain matching indents for the bosses, inserts, sleeves and/or the bushings. Assembly of the stack of plates with the bosses, inserts, sleeves or bushings may create interference fits to effectively seal the channels. Alternatively, the bosses, inserts, sleeves and/or bushings may be melt-bonded or adhesively bonded to the plates so as from a seal at the junction. Alternatively, the bosses, inserts, sleeves and/or bushings may be coated in the inside with a coating which functions to seal the channel. As mentioned above, the posts can function to seal the channels. It is contemplated that a combination of these sealing solutions may be utilized in single channel or in different channels. The components of the stack of plates, including dual polar, monopolar plates and bipolar plates, preferably have the same shape and common edges. This facilitates sealing of the edges. Where separators are present, they generally have a similar structure as the battery plates to accommodate the formation or creation of the transverse channels. The seal may be a thermoset polymer, such as an epoxy, polyurethane or acrylic polymer injected between the bolt and the transverse channel One or more channels may be formed by inserts, bosses, sleeves and/or bushings bonded to, in openings, and/or integral with openings in one or more battery plates and/or one or more separators. One or more posts in one or more channels may apply sufficient pressure to hold inserts, holes, bosses, sleeves and/or bushings in place to form a sealed passage. The one or more channels may be formed from inserts and/or bosses bonded and/or integrated into one or more battery plates and one or more separators. One or more posts may be bonded to one or more inserts, bosses and/or substrates of the battery by an adhesive bond or by fusion of thermoplastic polymers or both. The inserts and/or bosses may be inserted one or more battery plates and/or separators by interference fit or bonded in place by an adhesive. Inserts and/or bosses in one or more separators may contain one or more vent holes that may allow communication between one or more electrochemical cells and one or more channels. One or more vent holes may allow transmission of gasses from one or more electrochemical cells to one or more channels and prevent the transmission of one or more liquids (i.e., an electrolyte) from one or more electrochemical cells to one or more channels.

The battery assembly may include a membrane. The membrane may function to seal about the edges of one or more end plates, plurality of battery plates, one or more separators, one or more transfer sheets, one or more channels, or any combination thereof. The membrane may be bonded to the edges of the one or more end plates, plurality of battery plates, and/or one or more separators by any means that seals the edges of the end plates, battery plates, and separators and isolates the one or more electrochemical cells. Exemplary bonding methods comprise adhesive bonding, melt bonding, vibration welding, RF welding, and microwave welding among others. The membrane may be a sheet of a polymeric material which material can seal the edges of the end plates, monopolar plates, and bipolar plates and can withstand exposure to the electrolyte and the conditions the battery is exposed to internally and externally. The same materials useful for the substrate of the battery plates may be utilized for the membrane. The membrane may be a thermoplastic polymer that can be melt bonded, vibration welded, or molded about the substrates of the monopolar and bipolar plates. The same thermoplastic polymer may be utilized for the monopolar and bipolar substrates and the membranes. Exemplary materials are polyethylene, polypropylene, ABS and, polyester, with ABS most preferred. The membranes may be the size of the side of the stacks to which they are bonded. The membranes may be bonded to each side of the stack. The edges of the adjacent membranes may be sealed. The edges can be sealed using adhesives, melt bonding or a molding process. The membranes may comprise a single unitary sheet which is wrapped about the entire periphery of the stack. The membrane may have a leading edge and a trailing edge. The leading edge may be the first edge contact with the stack. The trailing edge may be the end, or last portion, of the membrane applied to the stack. The leading edge and the training edge may be bonded to the stack, to one another, or both to complete the seal of the membrane about the stack. This may be performed by use of an adhesive, by melt bonding or a molding process. In melt bonding the surface of the membrane and/or the edge of the stack are exposed to conditions at which the surface of one or both becomes molten and then the membrane and the edge of the stack are contacted while the surfaces are molten. The membrane and edge of the stack bond as the surface freezes forming a bond capable of sealing the components together. The membrane may be taken from a continuous sheet of the membrane material and cut to the desired length. The width of the membrane may match the height of the stacks of monopolar and bipolar plates. The membrane has sufficient thickness to seal the edges of the stack of monopolar and bipolar sheets to isolate the cells. The membrane may also function as a protective case surrounding the edges of the stack. The membrane may have a thickness of about 1 mm or greater, about 1.6 mm or greater or about 2 mm or greater. The membrane may have a thickness of about 5 mm or less, 4 mm or less or about 2.5 mm or less. When the membrane is bonded to the edge of the stack, any adhesive that can withstand exposure to the electrolyte and the conditions of operation of the cell may be used. Exemplary adhesives are plastic cements, epoxies, cyanoacrylate glues or acrylate resins. Alternatively, the membrane may be formed by molding a thermoplastic or thermoset material about a portion of, or all of the stack of battery plates. Any known molding method may be used including thermoforming, reaction injection molding, injection molding, roto molding, blow molding, compression molding and the like. The membrane may be formed by injection molding the membrane about a portion of or all of the stack of battery plates. Where the membrane is formed about a portion of the stack of the plates it may be formed about the edges of the battery plates or battery plates and the separator. The battery assembly may be free of a membrane. One or more integrated seals may function as a membrane while avoiding the need for the membrane. A method of forming a battery assembly may be free of disposing the stack of battery plates, the battery assembly, or both within a membrane.

A sealed battery assembly may be placed in a case to protect the formed battery. Alternatively, the membrane in conjunction with a protective covering over the monopolar plates at the end of the stack may be used as a case for the battery. The monopolar plates may have an appropriate protective cover attached or bonded to the surface opposite the anode or cathode. The cover may be the same material as the membrane or a material that can be adhesively bonded or melt bonded to the membrane and can have a thickness within the range recited for the membranes. If affixed to the end of the plates the cover can be affixed with any mechanical attachment including the posts having overlapping portions. The case may be formed by molding a membrane about the stacks of battery plates and/or the opposite sides of the monopolar plates. The battery assembly may be free of a case. One or more integrated seals may function as a case while avoiding the need for the case. A method of forming a battery assembly may be free of disposing the stack of battery plates, the battery assembly, or both within a case.

The battery assembly may include one or more posts. The one or more posts may function to hold the stack of components together in a fashion such that damage to components or breaking of the seal between the edges of the components of the stack is prevented, ensure uniform compression across the separator material, and ensure uniform thickness of the separator material. The one or more posts may have on each end an overlapping portion which engages the outside surface of opposing end plates, such as a sealing surface of each end plate. The overlapping portion may function to apply pressure on outside surfaces of opposing end plates in a manner so as to prevent damage to components or breaking of the seal between the edges of the components of the stack, and prevent bulging or other displacements of the stack during battery operation. The overlapping portion may be in contact with a sealing surface of an end plate. The stack may have a separate structural or protective end-piece over the monopolar endplate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack. The length of the one or more posts may vary based on the desired capacity of the battery. The posts may exhibit a cross-section shape and size so as to fill a channel. The posts may have a cross-sectional size greater than the cross-sectional size of one or more channels so that the posts form an interference fit one or more of the channels. The number of posts is chosen to support the end plate and edges of the substrates to prevent leakage of electrolytes and gasses evolved during operation and to prevent the compressive forces arising during operation from damaging components and the seal for the individual electrochemical cells and to minimize edge-stress forces that exceed the fatigue strength of the seals. The plurality of posts may be present so as to spread out the compressive forces generated during operation. There may be fewer posts than channels where one or more of the channels are utilized as cooling channels or vent/fill channels. For example, there may be four channels with three channels having a post located therein and one channel may be used as a cooling, vent, and/or fill channel. The posts may comprise any material that performs the necessary functions. If the post is utilized to seal the channels, then the material used is selected to withstand the operating conditions of the cells will not corrode when exposed to the electrolyte and can withstand the temperatures and pressures generated during operation of the cells. Where the posts perform the sealing function, the posts may comprise a polymeric or ceramic material that can withstand the conditions recited. In this embodiment the material must be non-conductive to prevent shorting out of the cells. The posts may comprise a polymeric material such as a thermoset polymer or a thermoplastic material. The posts may comprise a thermoplastic material. Exemplary thermoplastic materials include ABS (acrylonitrile-butadiene-styrene copolymers), polypropylene, polyester, thermoplastic polyurethanes, polyolefins, compounded thermoplastic resins, polycarbonates and the like. ABS is most preferred. Where the channels are separately sealed the posts can comprise any material that has the structural integrity to perform the desired functions. Of the polymeric materials recited above, ceramics and metals may be utilized. Suitable metals may be steel, brass aluminum, copper and the like. The posts can comprise molded posts, threaded posts or posts with one or more end attachments. The posts may be bonded to parts of the stacks, for example the substrates, inserts or bosses in the channels, and the like. The bonds can be formed from adhesives or fusion of the polymeric materials, such as thermoplastic materials. The one or more openings may have threaded surfaces. If threaded, the one or more posts may also be threaded to engaged with the threaded openings. Posts may include a head or nut on one end opposing a nut, hole for a brad, cotter pin, the like, or a combination thereof. This is generally the case for non-molded posts. The posts may be constructed in such a way as to be a one-way ratcheting device that allows shortening, but not lengthening. Such a post would be put in place, then as the stack is compressed, the post is shortened so that it maintains the pressure on the stack. The post in this embodiment may have ridges that facilitate the ratcheting so as to allow the posts to function as one part of a zip tie like structure. Matching nuts and/or washers may be used with posts so as to compress the plates they are adjacent to when in place. The nuts and/or washers go one way over the posts and ridges may be present to prevent the nuts and/or washers from moving the other direction along the posts. In use, the holes in the posts will have the appropriate brads, cotter pins, and the like to perform the recited function. If the post is molded is can be molded separately or in place. If molded in place, in situ, a seal may need to be present in the channel to hold the molten plastic in place. The seal may be formed by the interlocking inserts, a separate seal therein, or both. A nonconductive post which is threaded may be used and can provide the necessary seal. Alternatively, a pre-molded nonconductive polymeric post may be designed to form an interference fit in the channel in a manner so as seal the channels. The posts may be formed in place by molding, such as by injection molding.

The battery assembly may include one or more valves. The one or more valves may function to draw a vacuum from an interior of the battery assembly, fill the battery assembly with an electrolyte, and/or vent the battery assembly during operation. The one or more valves may include a pressure release valve, check valve, fill valve, pop valve, and the like, or any combination thereof. The one or more valves may be connected to and/or in communication with one or more channels formed by one or more openings of an end plate, battery plate, separator, or any combination thereof. The one or more valves may be in communication with a channel, such as a channel having a post there through or free of a post. The article may include one or more valves as described in US Patent Application Publication No. 2014/0349147, incorporated herein by reference in its entirety for all purposes. The assembly may contain pressure release valves for one or more of the cells to release pressure if the cell reaches a dangerous internal pressure. The pressure release valves are designed to prevent catastrophic failure in a manner which damages the system the battery is used with. Once a pressure release valve is released the battery is no longer functional. The assemblies disclosed may contain a single check valve which releases pressure from the entire assembly when or before a dangerous pressure is reached. Some exemplary suitable valves are disclosed in U.S. Pat. Nos. 8,357,469; 9,553,329, 9,685,677; 9,825,336; and US Patent Application Publication No.: 2018/0053926; incorporated herein by reference in their entirety for all purposes.

The article may include one or more terminals. The assembly may contain one or more pairs of conductive terminals, each pair connected to a positive and negative terminal. The one or more terminals may function to transmit the electrons generated in the electrochemical cells to a system that utilizes the generated electrons in the form of electricity. The terminals are adapted to connect each battery stack to a load; in essence, a system that utilizes the electricity generated in the cell. The one or more terminals may pass through one or more end plates, one or more battery plates, a membrane, and/or a case. The one or more terminals may pass through a battery plate from an end plate to the outside or passing through the side of the case or membrane about the assembly essentially parallel to the plane of the end plates. The terminal matches the polarity of the anode or cathode of the monopolar plate, dual polar plate, bipolar plate, or a combination thereof. The terminals are in contact with the conductive conduits in the assemblies. The cathode of the monopolar plate and the cathodes of one or more of the bipolar plates with a cathode current collector may be connected to independent positive terminals. The anode of the monopolar plate and the anodes of one or more of the bipolar plates with an anode current collector may be connected to independent negative terminals. The cathode current collectors may be connected, and the anode current collectors may be connected in parallel. The individual terminals may be covered in a membrane leaving only a single connected positive and a single connected negative terminal exposed. Some exemplary suitable terminal assemblies are disclosed in U.S. Pat. Nos. 8,357, 469; 9,553,329; 9,685,677; 9,825,336; and US Patent Application Publication No.: 2018/0053926; incorporated herein by reference in their entirety for all purposes.

The battery assembly may include one or more conductive conduits. The conductive conduits may function to transmit electrons from the current collectors in contact with the cathodes to one or more positive terminals. A typical bipolar battery may flow electrons from cell to cell through the substrate. Either the substrate at least partially comprises a conductive material or comprises conductive pathways through the substrate. When the circuit is closed that contains the cells electrons flow from cell to cell through the substrate to the positive terminal. It is contemplated that the assemblies may flow electrons through the substrates and cell, through a current collector to a current conductor or both. In the batteries disclosed herein having two or more stacks, each stack has a current conductor and/or a conductive conduit contacting the current collectors in contact with the anodes with a negative terminal and a current conductor and/or a conductive conduit contacting the current collectors in contact with the cathodes with a positive terminal. The conductive conduits from the two or more stacks may be arranged in parallel or in series. Parallel circuits comprise two or more circuits that are not connected to one another. Series circuits comprise two or more circuits that are arranged such that electrons flow through the circuits sequentially. When the conductive conduits are arranged in a series configuration, the battery may have only one negative terminal and one positive terminal. When the conductive conduits are arranged in a parallel manner, the battery may have single positive and negative terminals in which each circuit connects with each of the negative or positive terminals. Alternatively, each circuit may have separate negative and positive terminals. The terminals may be connected to the load which typically utilizes the electricity stored in the battery. Each of the current conductors and/or current conduits in contact with current collectors in contact with cathodes in a parallel arrangement may be contacted with separate positive terminals. Each of the current conductors and/or current conduits in contact with current collectors in contact with anodes in a parallel arrangement may be contacted with separate negative terminals.

Illustrative Examples

Figure 1B:
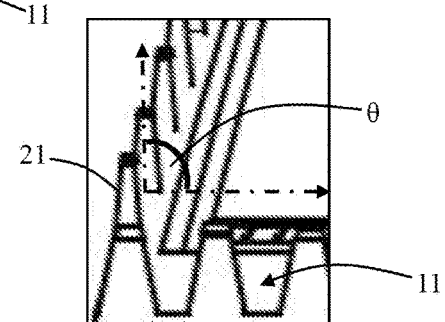
FIG. 1B is a partial view of the battery plate of FIG. 1A.

FIG. 1A illustrates a battery plate 10. The battery plate 10 includes a substrate 11. Extending from the substrate 11 is a plurality of projections 21. The projections 21 extend from a frame 20 of the substrate 11. The projections 21 are formed integrally as part of the frame 20. The projections 21 can extend from an inward facing surface 20a (as shown) and/or an exterior facing surface 20b of the frame 20. The projections 21 project about the periphery of the battery plate 10. The projections 21 extend like fingers of the battery plates 10 and from the frame 20. As illustrated in FIG. 1B, the projections 21 are at an angle Θ relative to the substrate 11. In this example, the projections 21 extend substantially perpendicular to a surface of the substrate 11.

Figure 2A:
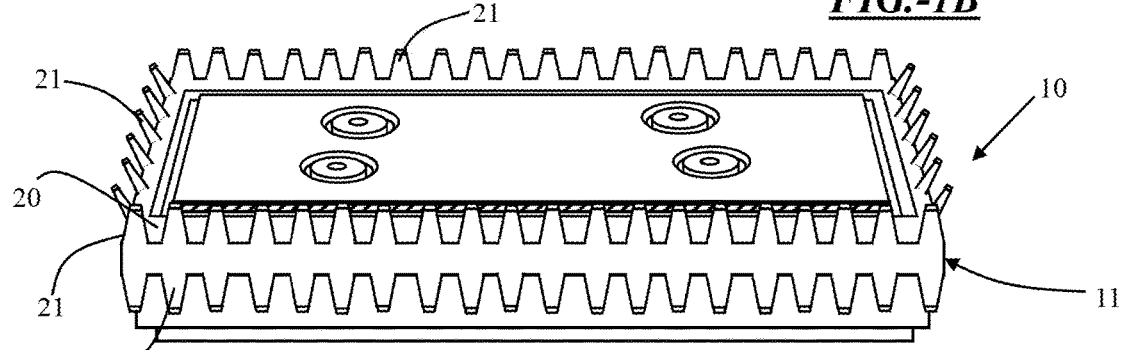
FIG. 2A is a perspective view of a battery plate.
Figure 2B:
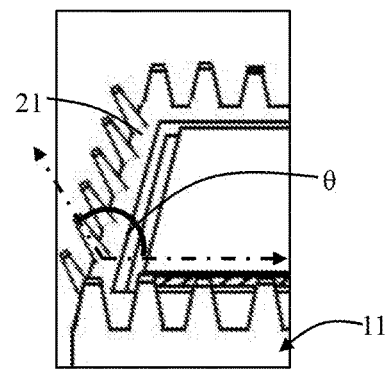
FIG. 2B is a partial view of the battery plate of FIG. 2A.

FIG. 2A illustrates a battery plate 10. The battery plate 10 includes a substrate 11. Extending from the substrate 11 is a plurality of projections 21. The projections 21 extend in opposing directions. The projections 21 extend from a frame 20 of the substrate 11. The projections 21 are formed integrally as part of the frame 20. The projections 21 project about the periphery of the battery plates 10. The projections 21 extend like fingers of the battery plates 10. As illustrated in FIG. 2B, the projections 21 are at an angle Θ relative to the substrate 11. In this example, the projections 21 extend in an obtuse angle relate to a surface of the substrate 11 and angle away from an interior of the battery plate 10.

FIGS. 3A-3D illustrate battery plates 10 having projections 21 which are melted together to form inter-melded edges located about the electrochemical cell 2. FIG. 3A illustrates projections 21 which project about the periphery of the battery plates 10. The projections 21 extend like fingers of the battery plates 10. The projections 21 are integral with a substrate 11 of the battery plates 10. FIG. 3B illustrates how the projections 21 mesh together such that they are intertwined or interlocking (e.g., interlocking fingers). FIG. 3B also illustrates the application of heat 22 to the periphery of the battery plates 10. The heat 22 causes the projections 21 to melt together such that they are intermelted and form an integral edge seal 23 about a periphery of the battery plates 10 as shown in FIG. 3C. FIG. 3D illustrates a stack of battery plates 10 having a plurality of integral edge seals 23.

FIGS. 4A-4E illustrate battery plates 10 having projections 21 which are meshed and then melted together to form a melt-bonded peripheral edge about the electrochemical cell 2. FIG. 4A illustrates projections 21 which project about the periphery of the battery plates 10. The projections 21 extend in a tooth-like manner from the battery plates 10. The projections 21 are integral with a substrate 11 of the battery plates 10. The projections 21 of one battery plate 10 are offset from the projections 21 of an adjacent battery plate 10. The projections 21 are offset from one another so that when the battery plates 10 are stacked, such as illustrated in FIG. 4B, the projections 21 mesh with each other. FIG. 4B also illustrates the application of heat 22 to the periphery of the battery plates 10. The heat 22 causes the projections 21 to melt together such that they are melt bonded and form an integral edge seal 23 about a periphery of the battery plates 10 as shown in FIG. 4C. FIG. 4D illustrates an exploded view of a stack of battery plates 10 with offset projections 21 and the gaps therebetween which will define the electrochemical cells 2. FIG. 4E illustrates a stack of battery plates 10 with the plurality of projections 21 meshed together before being melt bonded to form the integral edge seal 23.

Figure 5A:
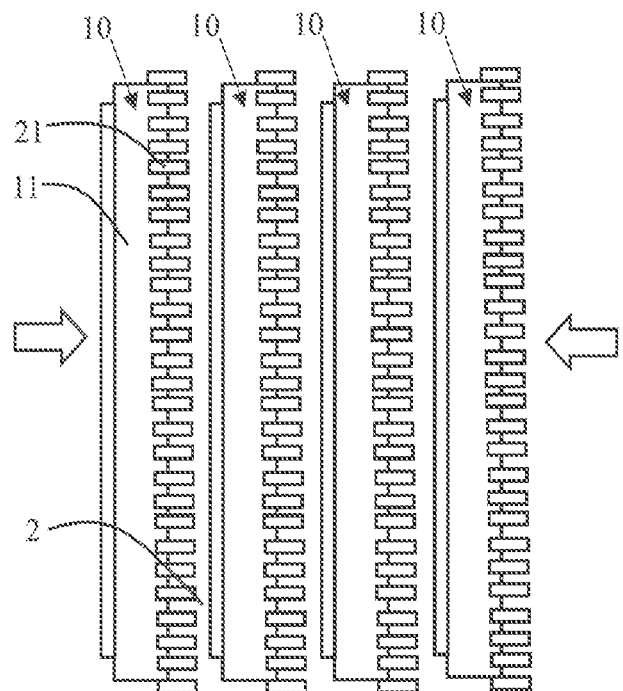
FIG. 5A illustrates a stack of battery plates having peripheral projections.
Figure 5B:
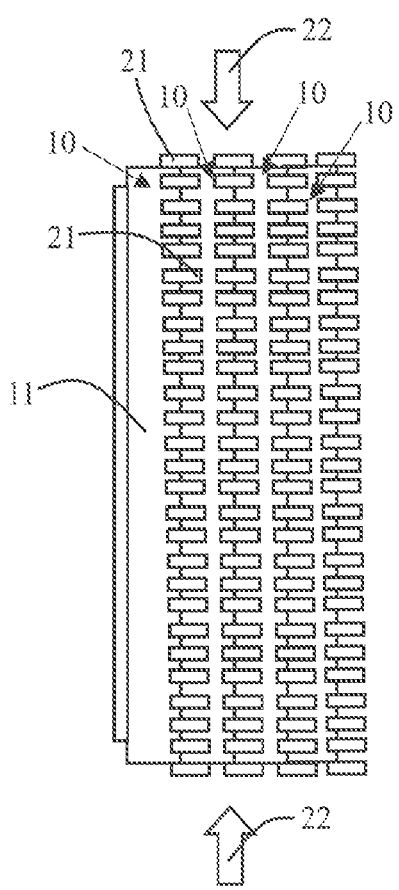
FIG. 5B illustrates a stack of battery plates having overlapping peripheral projections.
Figure 5C:
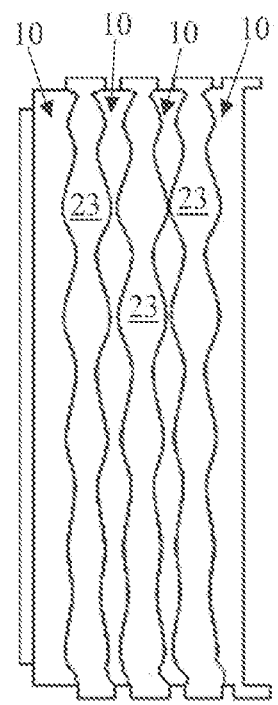
FIG. 5C illustrates a stack of battery plates melt-bonded together forming integrated edge seals about a plurality of electrochemical cells.

FIGS. 5A-5C illustrate battery plates 10 having projections 21 which overlap adjacent battery plates 10 to form an integral edge seal 23. FIG. 5A illustrates projections 21 which project about the periphery of the battery plates 10. The projections 21 may be a plurality of projections 21 spaced about the periphery of the battery plates 10 (such as illustrated). The projections 21 may be a single projection projecting about the periphery of the battery plates 10. The projections 21 are integral with a substrate 11 of the battery plates 10. When the battery plates are stacked, such as illustrated in FIG. 3B, the projections 21 overlap an adjacent battery plate 10. The projections 21 overlap and abut with an exterior peripheral surface of an adjacent battery plate 10. The projections 21 may overlap and abut with an exterior peripheral surface of a frame 20 of the adjacent battery plate 10. FIG. 3B also illustrates the application of heat 22 to the periphery of the battery plates 10. The heat 22 causes the projections 21 to melt and bond to the adjacent battery plates 10. The projections 21 may melt and bond to an exterior peripheral surface of the substrate 11. The projections 21 may melt and bond to an exterior peripheral surface of a frame 20. The projections 21 may even melt and bond to adjacent projections 21 of adjacent battery plates 10. Upon melt bonding, the projections 21 form an integrated edge seal 23.

FIGS. 6 and 7 illustrate a stack of battery plates 10 and separators 14 which form a battery assembly 1. FIG. 6 illustrates a partially exploded view of the stack while FIG. 7 illustrates a perspective view of the stack. Shown is an end plate 25 having a terminal hole 42 and holes 39 for posts 17 in the form of bolts and nuts 19. Adjacent to the end plate 25 is a battery plate 10 which is a monopolar plate 43 having a frame 20 with a raised edge. The monopolar plate 43 has raised inserts 41 that surround holes 40 used to form a transverse channel 16 and post 17 in the holes. Adjacent to the monopolar plate 43 is a separator 14. The separator 14 has a frame 34 about the periphery. The separator 14 includes an adsorbent glass mat 36 comprising the central portion within the frame 34. Molded inserts 35 surrounding molded insert holes 37 for forming the transverse channels 16 are shown. Adjacent to the separator 14 is a bipolar plate 44. The bipolar plate 44 includes a frame 20 about the periphery. The frame 20 is a raised surface. Raised inserts 41 are raised to form the transverse channel 16. The raised inserts 41 form raised insert holes 40 for the transverse channel FIG. 7 shows the stack of battery plates 10 and separators 14. Shown are end plates 25, battery plate substrate frames 20, separator frames 34, posts 17, and nuts 19 about the posts 17. A terminal hole 42 in the endplate 25 has a battery terminal 33 located therein.

FIG. 8 shows a side view of a stack of battery plates 10 which form a battery assembly 1. The battery plates may include one or more projections 21 (such as illustrated in FIGS. 1A-5C). The battery plates 10 include monopolar plates 43 at opposing ends of the stack of battery plates 10. In between the opposing monopolar plates 43 is a plurality of bipolar plates 44. Each of the battery plates 10 include a substrate 11. Adjacent to each substrate 11 of the bipolar plates 44 are anodes 12 and cathodes 13. Disposed between each pair of anodes 12 and cathodes 13 is a separator 14. The separator 14 is shown as an absorbent glass mat having a liquid electrolyte absorbed therein. Each pair of anodes 12 and cathodes 13 with the electrolyte therebetween form an electrochemical cell. Also shown is a transverse channel 16. A channel seal 15 is disposed within the transverse channel 16. The channel seal 15 is formed as a rubber tube. Located inside the channel seal 15 is a post 17. The post 17 is in the form of a threaded bolt. At the end of the post 17 are overlapping portions in the form of a bolt head 18 and nut 19. About the edge of the substrates 11 of both the monopolar plates 43 and bipolar plates 44 are frames 20.

Figure 9:
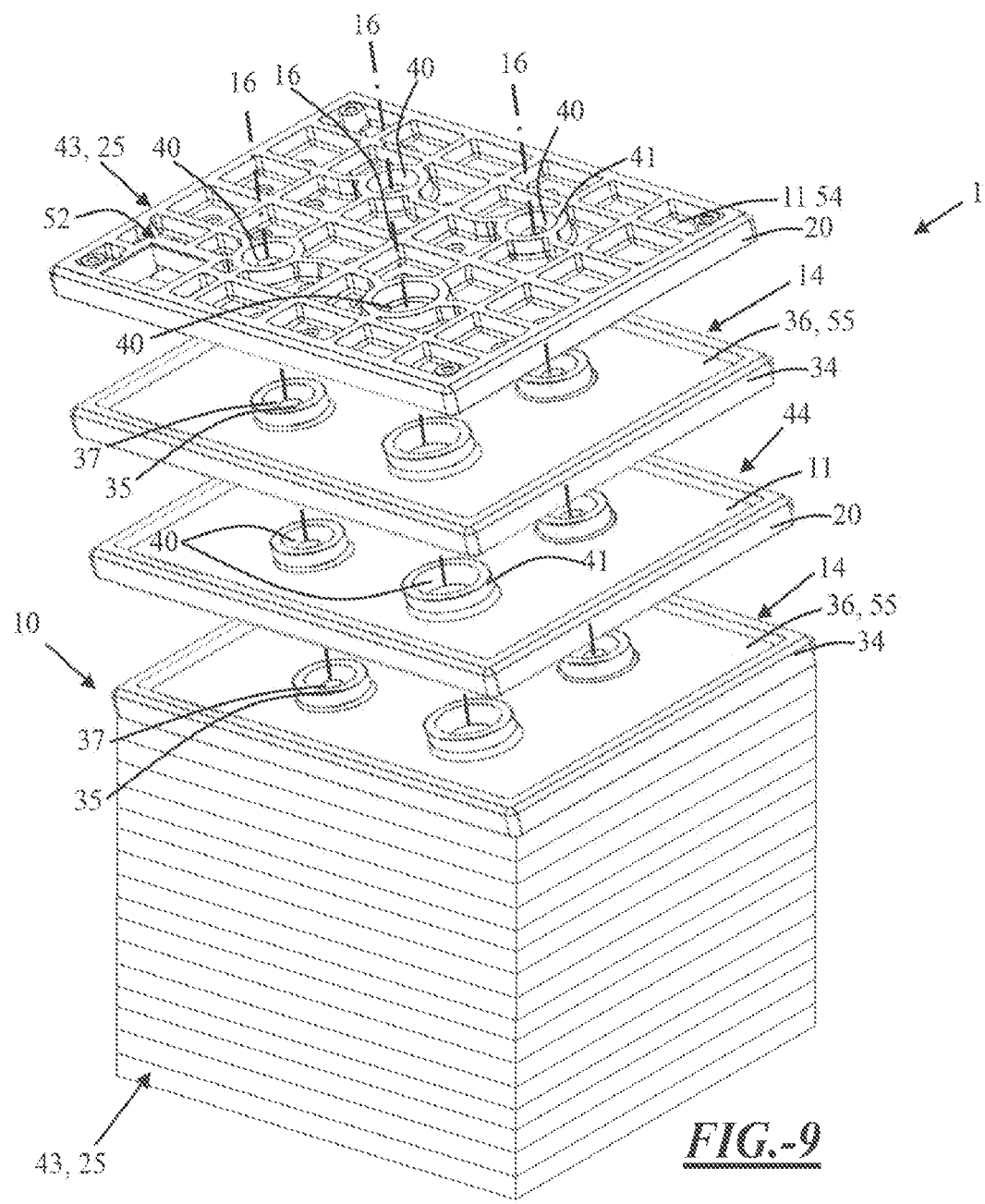
FIG. 9 illustrates a partially exploded view of a battery assembly.

FIG. 9 shows a partially exploded stack of battery plates 10 which form a battery assembly 1. The battery plates may include one or more projections 21 (such as illustrated in FIGS. 1A-5C). The battery plates 10 include opposing monopolar plates 43 at the ends of the stack and bipolar plates 44 therebetween. The battery plates 10 are alternatingly arranged with separators 14. A separator 14 is located between each pair of battery plates 10.

Shown is an end plate 25. The end plate 25 is a monopolar plate 43. The end plate 25 includes an internal reinforcement structure 52. The monopolar plate 43 includes a plurality of openings (holes) 40. Some of the openings 40 may be surrounded by an insert 41. The insert 41 may be raised and projecting from a base 54 of the monopolar plate 43. The base 54 is also the substrate 11 of the monopolar plate 43.

Adjacent to the monopolar plate 43 is a separator 14. The separator 14 includes a frame 34. The frame 34 forms a raised edge about the periphery of the separator 14. The separator 14 includes a sheet 55. The sheet 55 may be a glass mat, such as an absorbent glass mat (AGM) 36. The sheet 55 is located in the interior and adjacent to the frame 34. The sheet 55 may be integral with the frame 34 or affixed thereto. The separator 14 includes a plurality of openings (holes) 37. Some of the openings 37 may be at least partially surrounded by an insert 35. The insert 35 projects from the separator 14. The insert 35 projects from the sheet 55. Adjacent to the separator 14 is a bipolar plate 44.

The bipolar plate 44 includes a substrate 11 and a frame 20. The frame 20 forms a raised edge about the periphery of the substrate 11 of the bipolar plate 44. The bipolar plate 44 includes a plurality of openings (e.g., "insert hole") 40. Some of the openings 40 may be at least partially surrounded by an insert 41. The insert 41 projects from the substrate 11 of the bipolar plate 44.

The inserts 35, 41 and openings 40, 37 align. The inserts 35, 41 interlock to form one or more channels 16 through the stack of battery plates 10. The channels 16 pass transversely through the battery assembly 1 (i.e., forming transverse channels). One or more of the channels 16 can receive one or more posts 17 (not shown) therethrough. The one or more posts 24 (not shown) may extend through one or more of the channels 16. The battery plates 10 include one or more active materials on the substrate 11. The active materials may be an anode 12 or cathode 13 (not shown).

Figure 10:
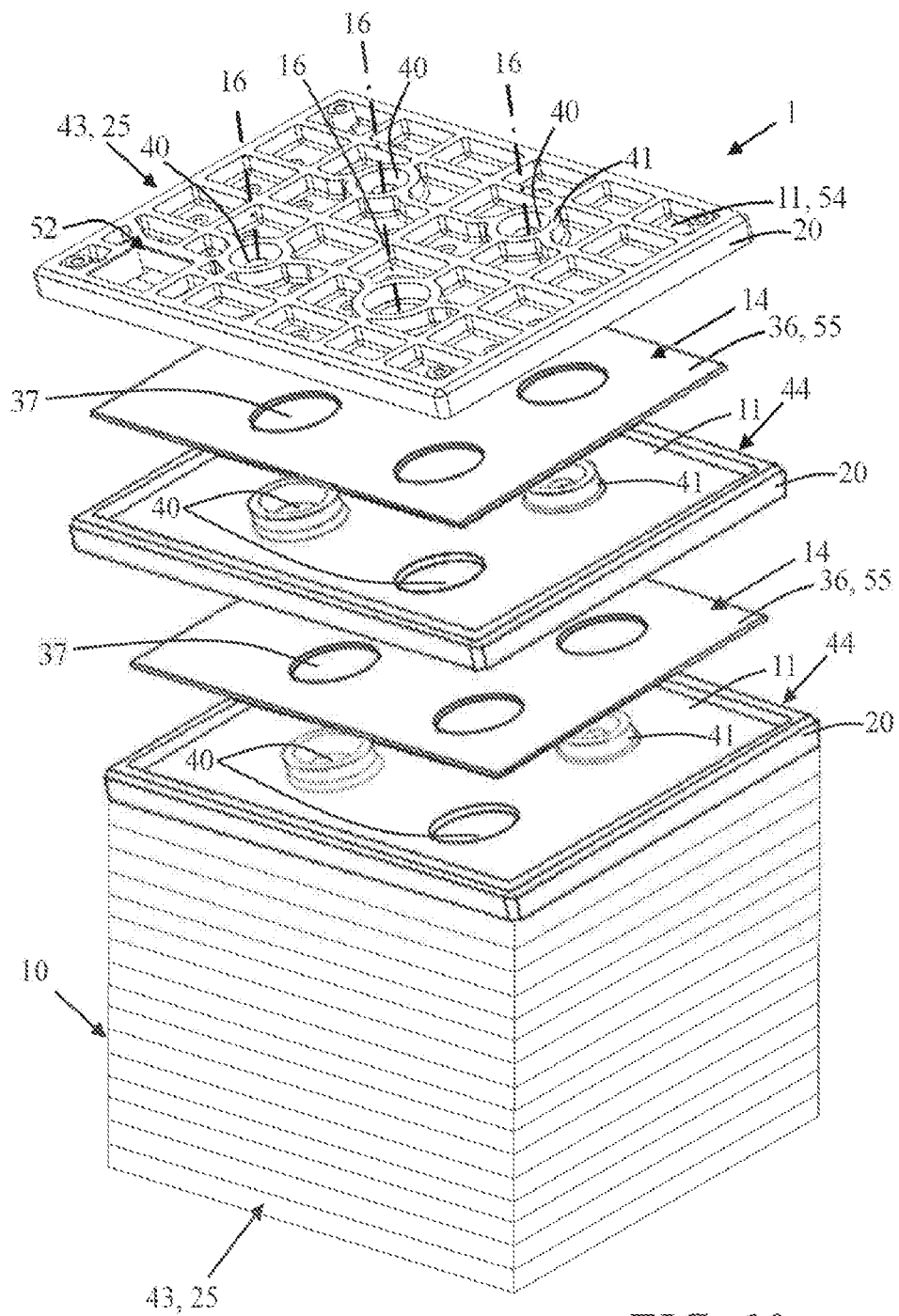
FIG. 10 illustrates a partially exploded view of a battery assembly.

FIG. 10 shows a partially exploded stack of battery plates 10 which form a battery assembly 1. The battery plates 10 may include one or more projections 21 (such as illustrated in FIGS. 1A-5C). The battery plates 10 include opposing monopolar plates 43 at the ends of the stack and bipolar plates 44 therebetween. The battery plates 10 are alternatingly arranged with separators 14. A separator 14 is located between each pair of battery plates 10.

Shown is an end plate 25. The end plate 25 is a monopolar plate 43. The end plate 25 includes an internal reinforcement structure 52. The monopolar plate 43 includes a plurality of openings (holes) 40. Some of the openings 40 may be surrounded by an insert 41. The insert 41 may be raised and projecting from a base 54 of the monopolar plate 43. The base 54 is also the substrate 11 of the monopolar plate 43.

Adjacent to the monopolar plate 43 is a separator 14. The separator 14 includes a sheet 55. The sheet 55 may be a glass mat, such as an absorbent glass mat (AGM) 36. The separator 14 is sized so as to fit within a frame 20 of a battery plate 10. The separator 14 includes a plurality of openings (holes) 37. Adjacent to the separator 14 is a bipolar plate 44.

The bipolar plate 44 includes a substrate 11 and a frame 20. The frame 20 forms a raised edge about the periphery of the substrate 11 of the bipolar plate 44. The bipolar plate 44 includes a plurality of openings (e.g., "insert hole") 40. Some of the openings 40 may be at least partially surrounded by an insert 41. The insert 41 projects from the substrate 11 of the bipolar plate 44.

The openings 40, 37 align to form one or more channels 16. The inserts 41 interlock to form one or more channels 16. The channels 16 pass through the stack of battery plates 10. The channels 16 pass transversely through the battery assembly 1 (i.e., forming transverse channels). One or more of the channels 16 can receive one or more posts 17 (not shown) therethrough. The one or more posts 24 (not shown) may extend through one or more of the channels 16. The battery plates 10 include one or more active materials on the substrate 11. The active materials may be an anode 12 or cathode 13 (not shown).

REFERENCE NUMBER LISTING

1—Battery assembly, 2—Electrochemical cell, 10—Battery plate, 11—Substrate of battery plate; 12—Anode; 13—Cathode: 14—Separator; 15—Channel seal; 16—Transverse channel; 17—Post; 18—Bolt head; 19—Nut; 20—Frame of battery plate; 21—Projections of battery plate; 22—Heat; 23—Integrated edge seal; 25—End plate; 33—Battery terminal; 34—Frame of separator; 35—Insert of separator; 36—Absorbent glass mat; 37—Insert hole in separator; 39—Hole; 40—Insert hole of battery plate; 41—Insert of battery plate; 42—Terminal hole; 43—Monopolar plate; 44—Bipolar plate; 52—internal reinforcement structure; 54—base; 55—sheet Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A method for forming a battery assembly including:
a) stacking a plurality of battery plates to form a plurality of electrochemical cells;
   wherein one or more individual battery plates include a plurality of projections extending from and about an exterior periphery of an individual battery plate toward one or more adjacent battery plates;
   wherein the plurality of projections of the individual battery plate are integrally formed with a substrate of the individual battery plate;
   wherein upon the stacking, the plurality of projections of the one or more individual battery plates overlap about an exterior peripheral surface of the one or more adjacent battery plates such that the plurality of projections are located on an exterior of a stack of the plurality of battery plates;
b) welding about the exterior periphery of the plurality of battery plates to form one or more integrated edge seals such that the one or more individual battery plates are bonded to the one or more adjacent battery plates; and
   wherein the one or more integrated edge seals are formed by the plurality of projections bonding to the exterior peripheral surface of the one or more adjacent battery plates upon which the plurality of projections are overlapped on.

2. The method of claim 1, wherein the method is free of disposing a casing, a membrane, or both about the plurality of battery plates.

3. The method of claim 1, wherein the method is free of including additional material separate from the battery plates to form the one or more integrated edge seals.

4. The method of claim 1, wherein the welding is a heat weld, a solvent weld, or a combination thereof.

5. The method of claim 4, wherein the weld is the heat weld, and wherein heat is applied via platen, hot gas, hot liquid, infrared, laser, friction, vibration, ultrasonic induction wire loop, radio frequency, or any combination thereof.

6. The method of claim 1, wherein the projections of the one or more individual battery plates mate with a plurality of other projections from the one or more adjacent battery plates, wherein the plurality of other projections extend from and about an exterior periphery of the one or more adjacent battery plates.

7. The method of claim 6, wherein the stacking of the plurality of battery plates includes mating the plurality of projections of the one or more individual battery plates with the plurality of other projections of the one or more adjacent battery plates.

8. The method of claim 7, wherein the mating of the plurality of projections with the plurality of other projections includes aligning reciprocally, interlocking, intertwining, meshing, or a combination thereof.

9. The method of claim 1, wherein the plurality of projections are a plurality of fingers, a plurality of teeth, peripheral lips, or any combination thereof.

10. The method of claim 1, wherein the plurality of projections melt together to form the one or more integrated edge seals.

11. The method of claim 1, wherein the plurality of projections form a snap-lock with a plurality of other projections.

12. The method of claim 1, wherein the one or more integrated edge seals form a liquid tight seal, a gas tight seal, or both about the plurality of electrochemical cells.

13. The method of claim 1, wherein the battery assembly is a bipolar battery.

14. The method of claim 1, wherein the method includes forming one or more substrates having the plurality of projections;
  wherein the one or more substrates include a frame integral about a periphery of each of the one or more substrates; and
  wherein the plurality of projections project from and are integral with the frame.

15. The method of claim 1, wherein the substrate of the one or more individual battery plates is integral with a frame about its periphery and the plurality of projections are integral with the frame such as to be integral with the substrate;
  wherein the method includes forming the plurality of battery plates by disposing one or more active materials on the substrate of the one or more individual battery plates; and
  wherein the one or more active materials are located on the substrate within the frame and within the plurality of projections.

16. The method of claim 1, wherein the method includes placing a current collector on the substrate; and
  wherein one or more active materials are disposed on the current collector.

17. The method of claim 1, wherein a separator is located between pairs of adjacent battery plates;
  wherein an electrolyte is located between the pairs of adjacent battery plates to form individual electrochemical cells, and
  wherein the electrolyte is a liquid electrolyte.

18. The method of claim 17, wherein the method includes filling the plurality of electrochemical cells with the liquid electrolyte after forming the one or more integrated edge seals.

19. A battery assembly comprising:
a) a stack of a plurality of battery plates which form a plurality of electrochemical cells, wherein the plurality of battery plates each include a substrate carrying one or more active materials thereon;
b) an integrated edge seal formed such that one or more individual battery plates of the stack are bonded to one or more adjacent battery plates of the stack;
  wherein a plurality of projections extend from and about an exterior periphery of one or more individual battery plates toward one or more adjacent battery plates and overlap about an exterior peripheral surface of the one or more adjacent battery plates such that the plurality of projections are on an exterior of the stack of the plurality of battery plates;
  wherein the plurality of projections of the one or more individual battery plates are integral with the substrate of the one or more individual battery plates; and
  wherein the plurality of projections are bonded to the one or more adjacent battery plates to form the integrated edge seal.

20. A method for forming a battery assembly including:
a) stacking a plurality of battery plates to form a plurality of electrochemical cells;
  wherein one or more individual battery plates include a plurality of projections extending from and about an exterior periphery of an individual battery plate toward one or more adjacent battery plates;
  wherein the plurality of projections of the individual battery plate are integrally formed with a frame and a substrate of the individual battery plate, wherein the substrate includes one or more active materials located thereon, wherein the frame forms a raised edge about the substrate, and wherein the substrate, the frame, and the plurality of projections together are one-piece;
  wherein upon the stacking, the plurality of projections of the one or more individual battery plates overlap about an exterior peripheral surface of the one or more adjacent battery plates and are located on an exterior of a stack of the plurality of battery plates;
b) welding about the exterior periphery of the plurality of battery plates to form one or more integrated edge seals such that the one or more individual battery plates are bonded to the one or more adjacent battery plates; and
  wherein the one or more integrated edge seals are formed by the plurality of projections bonding to the exterior peripheral surface of the one or more adjacent battery plates upon which the plurality of projections are overlapped on.

* * * * *